United States Patent
Karczewicz et al.

(10) Patent No.: US 10,448,058 B2
(45) Date of Patent: Oct. 15, 2019

(54) GROUPING PALETTE INDEX AT THE END AND INDEX CODING USING PALETTE SIZE AND RUN VALUE

(71) Applicant: QUALCOMM Incorporated, San Diego, CA (US)

(72) Inventors: Marta Karczewicz, San Diego, CA (US); Feng Zou, San Diego, CA (US); Vadim Seregin, San Diego, CA (US); Wei Pu, Pittsburgh, PA (US); Rajan Laxman Joshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 238 days.

(21) Appl. No.: 15/158,795

(22) Filed: May 19, 2016

(65) Prior Publication Data
US 2016/0345030 A1    Nov. 24, 2016

Related U.S. Application Data

(60) Provisional application No. 62/165,049, filed on May 21, 2015, provisional application No. 62/172,705, (Continued)

(51) Int. Cl.
*H04N 19/91* (2014.01)
*H04N 19/176* (2014.01)
(Continued)

(52) U.S. Cl.
CPC .......... *H04N 19/91* (2014.11); *H04N 19/124* (2014.11); *H04N 19/13* (2014.11); *H04N 19/172* (2014.11);
(Continued)

(58) Field of Classification Search
CPC .... H04N 19/91; H04N 19/124; H04N 19/187; H04N 19/186; H04N 19/172;
(Continued)

(56) References Cited

U.S. PATENT DOCUMENTS 5,402,123 A     3/1995   Jung
2011/0248873 A1  10/2011  Karczewicz et al.
(Continued)

FOREIGN PATENT DOCUMENTS

EP    2587802 A1    5/2013
WO    9517073 A1    6/1995
(Continued)

OTHER PUBLICATIONS

Sun et al. CE1-related Harmonization between JCTVC-T0065 Non CE1: Grouping Palette Indices at Front and CE1 Test A.1.5, Joint Collaborative Team on Video Coding (JCT-VC) of ITU-T SG 16 WP3 and ISO/IEC JTC 1/SC 29/WG 11, 20th Meeting: Geneva, CH, Feb. 10-18, 2015.*
(Continued)

*Primary Examiner* — Richard A Hansell, Jr.
(74) *Attorney, Agent, or Firm* — Shumaker & Sieffert, P.A.

(57) ABSTRACT

A device for decoding video data is configured to determine, based on first entropy encoded data in the bitstream, a set of run-related syntax element groups for a current block of a current picture of the video data; determine, based on second entropy encoded data the bitstream, a set of palette index syntax elements for the current block, the first entropy encoded data occurring in the bitstream before the second entropy encoded data, wherein: each respective run-related syntax element group of the set of run-related syntax element groups indicates a respective type of a respective run of identical palette mode type indicators and a respective
(Continued)

length of the respective run and each respective palette index syntax element of the set of palette index syntax elements indicates an entry in a palette comprising a set of sample values; and reconstruct, based on the sample values in the palette, the current block.

24 Claims, 8 Drawing Sheets

Related U.S. Application Data filed on Jun. 8, 2015, provisional application No. 62/172,778, filed on Jun. 8, 2015, provisional application No. 62/172,771, filed on Jun. 8, 2015, provisional application No. 62/173,201, filed on Jun. 9, 2015, provisional application No. 62/173,325, filed on Jun. 9, 2015, provisional application No. 62/173,298, filed on Jun. 9, 2015.

(51) Int. Cl.
| | |
|---|---|
| *H04N 19/70* | (2014.01) |
| *H04N 19/13* | (2014.01) |
| *H04N 19/593* | (2014.01) |
| *H04N 19/463* | (2014.01) |
| *H04N 19/124* | (2014.01) |
| *H04N 19/172* | (2014.01) |
| *H04N 19/186* | (2014.01) |
| *H04N 19/187* | (2014.01) |

(52) U.S. Cl.
CPC ......... *H04N 19/176* (2014.11); *H04N 19/186* (2014.11); *H04N 19/187* (2014.11); *H04N 19/463* (2014.11); *H04N 19/593* (2014.11); *H04N 19/70* (2014.11)

(58) Field of Classification Search
CPC .... H04N 19/463; H04N 19/593; H04N 19/13; H04N 19/70; H04N 19/176
See application file for complete search history.

(56) References Cited

U.S. PATENT DOCUMENTS

| | | | | |
|---|---|---|---|---|
| 2015/0146976 | A1* | 5/2015 | Ma | H04N 1/646 |
| | | | | 382/166 |
| 2015/0264365 | A1* | 9/2015 | Tsai | H04N 19/94 |
| | | | | 375/240.03 |
| 2016/0100179 | A1* | 4/2016 | He | H04N 19/176 |
| | | | | 375/240.25 |
| 2016/0286217 | A1* | 9/2016 | Hsiang | H04N 19/91 |
| 2017/0105002 | A1* | 4/2017 | Chuang | H04N 19/70 |

FOREIGN PATENT DOCUMENTS

| | | | |
|---|---|---|---|
| WO | 2011142817 A1 | 11/2011 | |
| WO | 2012051025 A1 | 4/2012 | |
| WO | WO 2015086717 A2 * | 6/2015 | ........... H04N 19/105 |
| WO | WO-2015086717 A2 * | 6/2015 | ........... H04N 19/105 |
| WO | WO 2016161974 A1 * | 10/2016 | ........... H04N 19/593 |
| WO | WO-2016161974 A1 * | 10/2016 | ........... H04N 19/593 |
| WO | WO 2016176822 A1 * | 11/2016 | ............... H04N 1/41 |
| WO | WO-2016176822 A1 * | 11/2016 | ............... H04N 1/41 |

OTHER PUBLICATIONS

Sun et al. CE1-related Harmonization between JCTVC-T0065 Non CE1: Grouping Palette Indices at Front and CE1 Test A. 1.5, Joint Collaborative Team on Video Coding (JCT-VC) of ITU-T SG 16 WP3 and ISO/I EC JTC 1/SC 29/WG 11,20th Meeting: Geneva, CH, Feb. 10-18, 2015 (Year: 2015).*
Chen C-C., et al., "CE3: Summary report for Core Experiment 3 on Intra Line Copy and Intra String Copy," 20th Meeting: Geneva, CH, Feb. 10-18, 2015; Joint Collaborative Team on Video Coding (JCT-VC) of ITU-T SG 16 WP 3 and ISO/IEC JTC 1/SC 29/WG 11, JCTVC-T0023, Feb. 10, 2015, 15 pp.
Flynn., et al., "High Efficiency Video Coding (HEVC) Range Extensions text specification: Draft7," JCT-VC meeting, MPEG meeting; Mar. 27-Apr. 14, 2014; Incheon, KR; (Joint Collaborative Team on Video Coding of ISO/IEC JTC1/SC29/WG11 and ITU-T SG.16); Document: JCTVC-Q1005_v4, Apr. 10, 2014, 376 pp.
Guo L., et al., "Color Palette for Screen Content Coding", 2014 IEEE International Conference on Image Processing (ICIP), Oct. 1, 2014, XP055179887, DOI:10.1109/ICIP.2014.7026124, ISBN: 978-1-47-995751-4; 5 pp.
International Search Report and Written Opinion from International Application No. PCT/US2016/033589, dated Dec. 21, 2016, 31 pp.
Joshi, et al., "High Efficiency Video Coding (HEVC) Screen Content Coding: Draft 3," JCT-VC Meeting; Feb. 10-17, 2015; (Joint Collaborative Team on Video Coding of ISO/IEC JTC1/SC29/WG11 and ITU-T SG.16 ); No. JCTVC-T1005_v2, Apr. 5, 2015, 567 pp.
Joshi R., et al., "High Efficiency Video Coding (HEVC) Screen Content Coding: Draft 2, Document JCTVC-S1005," XP055263982, 18th Meeting, Sapporo, JP, Jun. 30-Jul. 9, 2014, Retrieved from the Internet: URL: http://phenix.int-evry.fr/jct/ [retrieved on Apr. 8, 2816]; Oct. 12, 2014, 365 pp.
Karczewicz M., et al., "CE6: Test B.1 Context Coded CU-Level Escape Colour Flag," 19. JCT-VC Meeting, Oct. 17 through 24, 2014, Strasbourg, FR; (Joint Collaborative Team on Video Coding of ISO/IEC JTC1/SC29/WG11 and ITU-T SG.16), URL: HTTP://WFTP3.ITU.INT/AV-ARCH/JCTVC-SITE/, No. JCTVC-S0154, Oct. 8, 2014, XP030116926, 2 pp.
Karczewicz M., et al., "Non CE1: Grouping Palette Indices at Front," 20, JCT-VC Meeting; Feb. 10 through 18, 2015; Geneva, CH; (Joint Collaborative Team on Video Coding of ISO/IEC JTC1/SC29/WG11 and ITU-T SG.16 ); URL: HTTP://WFTP3.ITU.INT/AV-ARCH/JCTVC-SITE/ No. JCTVC-T0065-v5, Feb. 11, 2015, XP030117191, 3 pp.
Lee S., et al., "Efficient Coefficient Coding Method for Large Transform in VLC Mode," 3. JCT-VC Meeting; 94. MPEG Meeting; Oct. 7, 2010-Oct. 15, 2010; Guangzhou; (Joint Collaborative Team on Video Coding of ISO/IEC JTC1/SC29/WG11 and ITU-T SG.16); URL: HTTP://WFTP3.ITU.INT/AV-ARCH/JCTVC-SITE/, No. JCTVC-C210, Oct. 2, 2010 (Oct. 2, 2010), XP0300079170, pp. 1-4.
Partial International Search Report from International Application No. PCT/US2016/033589 , dated Sep. 8, 2016, 14 pp.
Sun Y-C., et al., "CE1-Related: Harmonization Between JCTVC-T0065 Non CE1: Grouping Palette Indices at Front and CE1 Test A.1.5," 20. JCT-VC Meeting, Feb. 10 through 18, 2015, Geneva, CH; (Joint Collaborative Team on Video Coding of ISO/IEC JTC1/SC29/WG11 and ITU-T SG.16); URL: HTTP://WFTP3.ITU.INT/AV-ARCH/JCTVC-SITE/, No. JCTVC-T0233, Apr. 5, 2015, XP030117406, 6 pp.
Ugur K., et al., "Appendix to Description of video coding technology proposal by Tandberg, Nokia, Ericsson," Joint collaborative Team on Video Coding (JCT-VC) of ITU-T SG16 WP3 and ISO/IEC JTC1 /SC29/ W11 1st Meeting, No. JCTVC-A119 Appendix, Apr. 15, 2010 XP030007563, Dresden, DE ISSN: 0000-0049, 55 pp.
Wang, et al., "High Efficiency Video Coding (HEVC) Defect Report 2," Joint Collaboration Team of Video Coding, ITU-T SG 16 WP 3 and ISO/IEC JTC 1/SC 29/WG 11, Oct. 23-Nov. 1, 2013, Document JCTVC-O1003_V2, Nov. 24, 2013, 311 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

(56) References Cited

OTHER PUBLICATIONS

Guo et al., "Palette Mode for Screen Content Coding," 13th Meeting, Apr. 18 through 26, 2013, Incheon, KR; (Joint collaborative Team on Video Coding (JCT-VC) of ITU-T SG 16 WP 3 and ISO/IEC JTC 1/SC 29/WG 11), JCTVC-M0323, Apr. 8, 2013, 5 pp.
Misra et al., "SCE2 Cross check report for test 2.2," 14th Meeting, Jul. 25 through Aug. 2, 2013, Vienna, AT; (Joint collaborative Team on Video Coding (JCT-VC) of ITU-T SG 16 WP 3 and ISO/IEC JTC 1/SC 29/WG 11), JCTVC-N0259, Jul. 22, 2013, 2 pp.
Karczewicz et al., "Non CEw: Grouping Palette Indices at Front," 20th Meeting, Feb. 10 through 18, 2015, Geneva, CH; (Joint Collaborative Team on Video Coding (JCT-VC) of ITU-T SG 16 WP 3 and ISO/IEC JTC 1/SC 29/ WG 11); JCTVC-T0065_r1, Feb. 10, 2015, 3 pp.
Invitation to Pay Additional Fees from International Application No. PCT/US2016/033589, dated Jun. 8, 2017, 2 pp.
Response to Written Opinion dated Dec. 21, 2016, from International Application No. PCT/US2016/033589, filed on Mar. 21, 2017, 4 pp.
Second Written Opinion from International Application No. PCT/US2016/033589, dated Jul. 25, 2017, 11 pp.
International Preliminary Report on Patentability—PCT/US2016/033589—ISA/EPO—dated Oct. 19, 2017, 48 pages.

\* cited by examiner

Reference Palette

| Index | Pixel Value |
|---|---|
| 0 | $v_0$ |
| 1 | $v_1$ |
| 2 | $v_2$ |
| 3 | $v_3$ |
| 4 | $v_4$ |
| 5 | $v_5$ |

Current Palette

| Pred flag | Index | Pixel Value |
|---|---|---|
| 1 | 0 | $v_0$ |
| 0 | | |
| 1 | 1 | $v_2$ |
| 1 | 2 | $v_3$ |
| 1 | 3 | $v_4$ |
| 1 | 4 | $v_5$ |
| | 5 | $u_0$ |
| | 6 | $u_1$ |

FIG. 4

GROUPING PALETTE INDEX AT THE END AND INDEX CODING USING PALETTE SIZE AND RUN VALUE

This application claims the benefit of:
U.S. Provisional Patent Application No. 62/165,049, filed 21 May 2015;
U.S. Provisional Patent Application No. 62/172,705, filed 8 Jun. 2015;
U.S. Provisional Patent Application No. 62/172,778, filed 8 Jun. 2015;
U.S. Provisional Patent Application No. 62/172,771, filed 8 Jun. 2015;
U.S. Provisional Patent Application No. 62/173,201, filed 9 Jun. 2015;
U.S. Provisional Patent Application No. 62/173,325, filed 9 Jun. 2015; and
U.S. Provisional Patent Application No. 62/173,298, filed 9 Jun. 2015,
the entire content each of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the H.265, High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized.

SUMMARY

This disclosure describes techniques for video coding and compression. In particular, this disclosure describes techniques to support coding of video content, especially screen content, with palette coding. In traditional video coding, images are assumed to be continuous-tone and spatially smooth. Based on these assumptions, various tools have been developed such as block-based transform, filtering, etc., and such tools have shown good performance for natural content videos.

In one example, a method of decoding video data includes determining, based on first entropy encoded data in a bitstream, a set of run-related syntax element groups for a current block of a current picture of the video data; determining, based on second entropy encoded data the bitstream, a set of palette index syntax elements for the current block, the first entropy encoded data occurring in the bitstream before the second entropy encoded data, wherein: each respective run-related syntax element group of the set of run-related syntax element groups indicates a respective type of a respective run of identical palette mode type indicators and a respective length of the respective run, each respective palette index syntax element of the set of palette index syntax elements indicates an entry in a palette comprising a set of sample values; and reconstructing, based on the sample values in the palette, the current block.

In another example, a device for decoding video data includes a memory configured to store a bitstream of video data; and one or more processors configured to: determine, based on first entropy encoded data in the bitstream, a set of run-related syntax element groups for a current block of a current picture of the video data; determine, based on second entropy encoded data the bitstream, a set of palette index syntax elements for the current block, the first entropy encoded data occurring in the bitstream before the second entropy encoded data, wherein: each respective run-related syntax element group of the set of run-related syntax element groups indicates a respective type of a respective run of identical palette mode type indicators and a respective length of the respective run, each respective palette index syntax element of the set of palette index syntax elements indicates an entry in a palette comprising a set of sample values; and reconstruct, based on the sample values in the palette, the current block.

In another example, an apparatus for decoding video data includes means for determining, based on first entropy encoded data in a bitstream, a set of run-related syntax element groups for a current block of a current picture of the video data; means for determining, based on second entropy encoded data the bitstream, a set of palette index syntax elements for the current block, the first entropy encoded data occurring in the bitstream before the second entropy encoded data, wherein: each respective run-related syntax element group of the set of run-related syntax element groups indicates a respective type of a respective run of identical palette mode type indicators and a respective length of the respective run, each respective palette index syntax element of the set of palette index syntax elements indicates an entry in a palette comprising a set of sample values; and means for reconstructing, based on the sample values in the palette, the current block.

In another example, a computer readable storage medium storing instructions that when executed by one or more processors cause the one or more processors to: determine, based on first entropy encoded data in a bitstream, a set of run-related syntax element groups for a current block of a current picture of the video data; determine, based on second entropy encoded data the bitstream, a set of palette index syntax elements for the current block, the first entropy encoded data occurring in the bitstream before the second entropy encoded data, wherein: each respective run-related syntax element group of the set of run-related syntax element groups indicates a respective type of a respective run of identical palette mode type indicators and a respective length of the respective run, each respective palette index syntax element of the set of palette index syntax elements indicates an entry in a palette comprising a set of sample values; and reconstruct, based on the sample values in the palette, the current block.

The details of one or more examples are set forth in the accompanying drawings and the description below. Other features, objects, and advantages will be apparent from the description and drawings, and from the claims.

BRIEF DESCRIPTION OF DRAWINGS

FIG. 4 is a conceptual diagram illustrating examples of determining indices to a palette for a video block, consistent with techniques of this disclosure.

DETAILED DESCRIPTION

Figure 1:
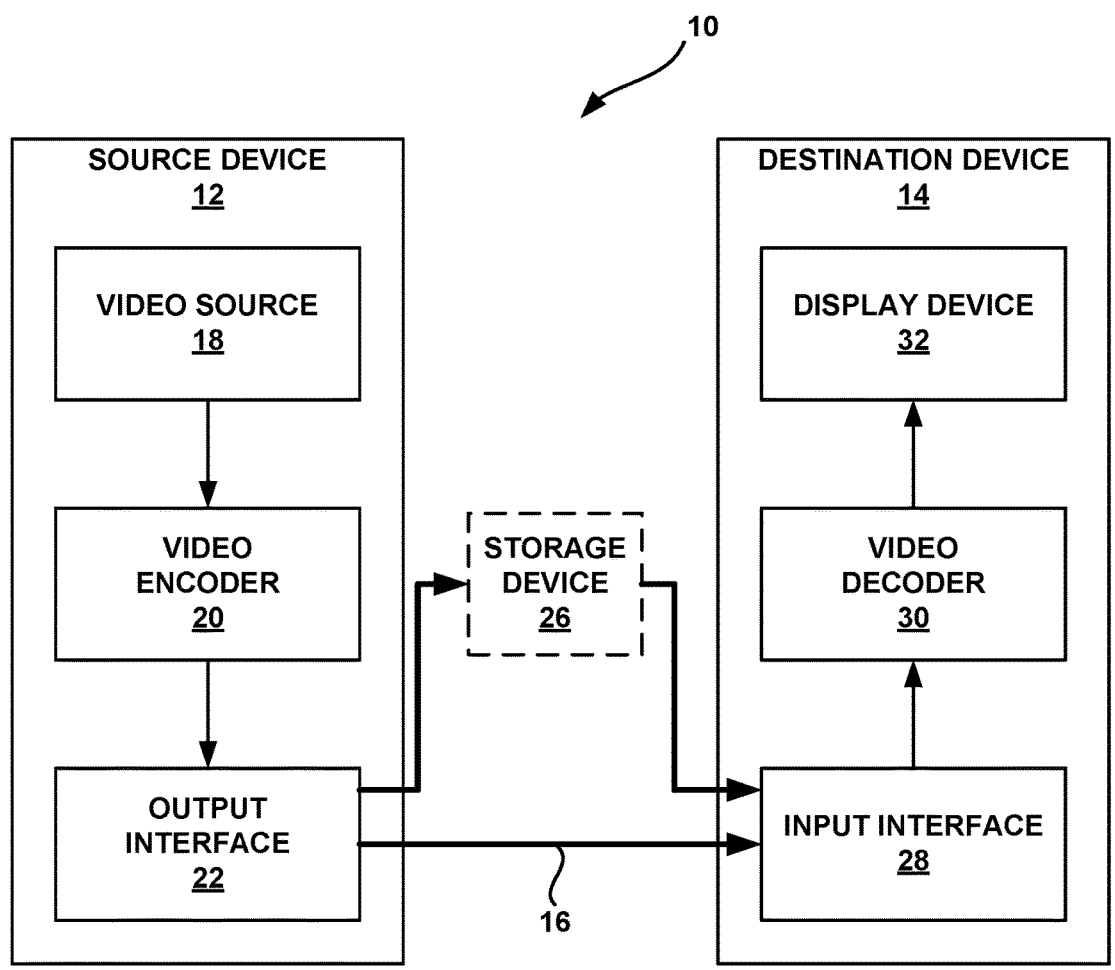
FIG. 1 is a block diagram illustrating an example video coding system that may utilize the techniques described in this disclosure.

This disclosure describes techniques for video coding and compression. In particular, this disclosure describes techniques to support coding of video content, especially screen content, with palette coding. In traditional video coding, images are assumed to be continuous-tone and spatially smooth. Based on these assumptions, various tools have been developed such as block-based transform, filtering, etc., and such tools have shown good performance for natural content videos.

However, in applications like remote desktop, collaborative work, and wireless display, computer generated screen content may be the dominant content to be compressed. This type of content tends to have discrete-tone and feature sharp lines, and high contrast object boundaries. The assumption of continuous-tone and smoothness may no longer apply, and thus, traditional video coding techniques may be inefficient when used to compress certain types of video content, such as screen content.

This disclosure describes techniques related to palette-based coding, which may be particularly suitable for screen generated content coding. For example, assuming a particular area of video data has a relatively small number of colors. A video coder (e.g., a video encoder or video decoder) may code a so-called "palette" as a table of colors for representing the video data of the particular area (e.g., a given block). Each pixel may be associated with an entry in the palette that represents the color of the pixel. For example, the video coder may code an index that relates the pixel value to the appropriate value in the palette.

In the example above, a video encoder may encode a block of video data by determining a palette for the block, locating an entry in the palette to represent the value of each pixel, and encoding the palette with index values for the pixels relating the pixel value to the palette. A video decoder may determine, based on syntax elements obtained from an encoded bitstream, a palette for a block, as well as index values for the pixels of the block. The video decoder may relate the index values of the pixels to entries of the palette to reconstruct the pixel values of the block. The example above is intended to provide a general description of palette-based coding.

The techniques of this disclosure are generally directed to techniques for efficiently coding the syntax elements (e.g. index syntax elements, run syntax elements, and escape syntax elements) that are utilized in palate mode coding. As will be explained in greater detail below, the techniques of this disclosure include grouping non-context coded index bins, which may be bypass coded, after context-coded run values, which may be Context-Adaptive Binary Arithmetic Coding (CABAC) coded. This disclosure also describes techniques for determining contexts for run values when run values are coded before index values, meaning a context for the run values cannot be determined using the index values. This disclosure also describes various binarization techniques for the index values. The techniques of this disclosure may, in some coding scenarios, sequence palette mode coding-related syntax elements and utilize binarization techniques and context determining techniques in a manner that produces coding gains when compared to existing techniques. The techniques of this disclosure may also, in some coding scenarios, improve hardware efficiency.

In accordance with an example of this disclosure, a video decoder may determine, based on first entropy encoded data in a bitstream, a set of run-related syntax element groups for a current block of a current picture of the video data. Furthermore, the video decoder may determine, based on second entropy encoded data in the bitstream, a set of palette index syntax elements for the current block, the set of palette index syntax elements occurring in the bitstream after the set of run-related syntax element groups. In this example, each respective run-related syntax element group of the set of run-related syntax element groups indicates a respective type of a respective run of identical palette mode type indicators and a respective length of the respective run. In this example, each respective palette index syntax element of the set of palette index syntax elements indicating an entry in a palette comprising a set of sample values. The video decoder may reconstruct, based on the sample values in the palette, the current block.

Similarly, in one example, a video encoder may include, in a bitstream, first entropy encoded data corresponding to a set of run-related syntax element groups for a current block of a current picture of the video data. The video encoder may include, in the bitstream, second entropy encoded data corresponding to a set of palette index syntax elements for the current block. In this example, the first entropy encoded data occurs in the bitstream before the second entropy encoded data. In this example, each respective run-related syntax element group of the set of run-related syntax element groups indicates a respective type of a respective run of identical palette mode type indicators and a respective length of the respective run. In this example, each respective palette index syntax element of the set of palette index syntax elements indicates an entry in a palette comprising a set of sample values.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 26. Similarly, encoded data may be accessed from storage device 26 by input interface. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264

(also known as ISO/IEC MPEG-4 AVC), including its Scalable Video Coding (SVC) and Multiview Video Coding (MVC) extensions. Recently, the design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). The latest HEVC specification, referred to as HEVC Version 1 hereinafter, is available from http://www.itu.int/rec/T-REC-H.265-201304-I. The Range Extensions to HEVC, namely HEVC-Rext, are also being developed by the JCT-VC. A recent Working Draft (WD) of Range extensions, referred to as REx WD7 hereinafter, is available from http://phenix.int-evey.fr/jct/doc_end_user/documents/17_Valencia/wg11/JCTVC-Q1005-v4.zip. Recently, JCT-VC has started the development of screen content coding (SCC), which is based on the HEVC-Rext and certain major techniques are under consideration.

Video encoder 20 and video decoder 30 may operate according to a video compression standard, such as the HEVC standard, and may conform to the HEVC Test Model (HM). Video encoder 20 and video decoder 30 may also operate according to other proprietary or industry standards, including any of the standards listed above, as well as new standards presently under development. The techniques of this disclosure are not limited to any particular coding standard.

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions, and other future codec designs and standards.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As introduced above, the JCT-VC has recently finalized development of the HEVC standard. The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction, inter prediction, or another coding mode such as palette coding to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform CABAC on the syntax elements indicating the quantized transform coefficients.

To apply CABAC encoding to a syntax element, the video encoder may binarize the syntax element to form a series of one or more bits, which are referred to as "bins." In addition, the video encoder may identify a coding context. The coding context may identify probabilities of coding bins having particular values. For instance, a coding context may indicate a 0.7 probability of coding a 0-valued bin and a 0.3 probability of coding a 1-valued bin. After identifying the coding context, the video encoder may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, the video encoder may repeat these steps with the interval being the sub-interval associated with the value of the encoded bit. When the video encoder repeats these steps for the next bin, the video encoder may use modified, i.e., updated, probabilities based on the probabilities indicated by the identified coding context and the actual values of bins encoded.

When a video decoder performs CABAC decoding on a syntax element, the video decoder may identify a coding context. The video decoder may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, the video decoder may decode a bin having the value associated with the lower sub-interval. If the encoded value is within the upper sub-interval, the video decoder may decode a bin having the value associated with the upper sub-interval. To decode a next bin of the syntax element, the video decoder may repeat these steps with the interval being the sub-interval that contains the encoded value. When the video decoder repeats these steps for the next bin, the video decoder may use modified probabilities based on the probabilities indicated by the identified coding context and the decoded bins. The video decoder may then de-binarize the bins to recover the syntax element.

Rather than performing regular CABAC encoding on all syntax elements, the video encoder may encode some syntax elements (e.g., bins) using bypass CABAC coding techniques. It may be computationally less expensive to perform bypass CABAC coding on a bin than to perform regular CABAC coding on the bin. Furthermore, performing bypass CABAC coding may allow for a higher degree of parallelization and throughput. Bins encoded using bypass CABAC coding may be referred to as "bypass bins." Grouping bypass bins together may increase the throughput of the video encoder and video decoder. The bypass CABAC coding engine may be able to code several bins in a single cycle, whereas the regular CABAC coding engine may be able to code only a single bin in a cycle. The bypass CABAC coding engine may be simpler because the bypass CABAC coding engine does not select contexts and may assume a probability of ½ for both symbols (0 and 1). Consequently, in bypass CABAC coding, the intervals can be conceptualized as being split directly in half.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for Supplemental Enhancement Information (SEI), and so on. NAL units that encapsulate RBSPs for video coding data (as opposed to RBSPs for parameter sets and SEI messages) may be referred to as video coding layer (VCL) NAL units.

In the example of FIG. 1, video decoder 30 receives a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use intra prediction or inter prediction to determine predictive blocks of the PUs of a current CU. In addition, video decoder 30 may inverse quantize coefficient blocks for TUs of the current CU. Video decoder 30 may perform inverse transforms on the coefficient blocks to reconstruct transform blocks for the TUs of the current CU. Video decoder 30 may reconstruct the coding blocks of the current CU by adding the samples of the predictive blocks for PUs of the current CU to corresponding samples of the transform blocks for the TUs of the current CU. By reconstructing the coding blocks for each CU of a picture, video decoder 30 may reconstruct the picture.

In some examples, video encoder 20 and video decoder 30 may be configured to perform palette-based coding. For example, in palette based coding, rather than performing the intra-predictive or inter-predictive coding techniques described above, video encoder 20 and video decoder 30 may code a so-called palette as a table of colors for representing the video data of the particular area (e.g., a given block). Each pixel may be associated with an entry in the palette that represents the color of the pixel. For example, video encoder 20 and video decoder 30 may code an index that relates the pixel value to the appropriate value in the palette.

In the example above, video encoder 20 may encode a block of video data by determining a palette for the block, locating an entry in the palette to represent the value of each pixel, and encoding the palette with index values for the pixels relating the pixel value to the palette. Video decoder 30 may obtain, from an encoded bitstream, a palette for a block, as well as index values for the pixels of the block. Video decoder 30 may relate the index values of the pixels to entries of the palette to reconstruct the pixel values of the block.

In some examples, video encoder 20 may encode one or more syntax elements indicating a number of consecutive pixels in a given scan order that have the same pixel value. The string of like-valued pixel values may be referred to herein as a "run." In an example for purposes of illustration, if two consecutive pixels in a given scan order have different values, the run is equal to zero. If two consecutive pixels in a given scan order have the same value but the third pixel in the scan order has a different value, the run is equal to one. Video decoder 30 may obtain the syntax elements indicating a run from an encoded bitstream and use the data to determine the number of consecutive pixel locations that have the same index value.

In some examples, video encoder 20 and video decoder 30 may perform line copying for one or more entries of a map. For example, video encoder 20 may indicate that a pixel value for a particular entry in a map is equal to an entry in a line above the particular entry. Video encoder 20 may also indicate, as a run, the number of indices in the scan order that are equal to the entry in the line above of the particular entry. In this example, video encoder 20 and or video decoder 30 may copy index values from the specified neighboring line and from the specified number of entries for the line of the map currently being coded.

As described in more detail below, in palette mode, a palette includes entries numbered by an index representing color component values that can be used as predictors for block samples or as final reconstructed block samples. Each entry in the palette may contain one color component (e.g., luma value) or two components (e.g., two chroma values), or three color components (e.g., RGB, YUV, etc.).

As introduced above, extensions to HEVC and other coding standards may implement coding modes other than intra and inter prediction. One such coding mode is palette mode, in which video encoder 20 and video decoder 30 may both derive a palette for a block of pixels, where each entry in the palette table includes color values that are identified by indices into the palette table. Video encoder 20 may then encode, for the samples of the palette mode, encoded block index values indicating which entry of the palette corresponds to the color values for the various samples of the block. Video decoder 30 receives the index values and, based on the index values, reconstructs the block.

Figure 2:
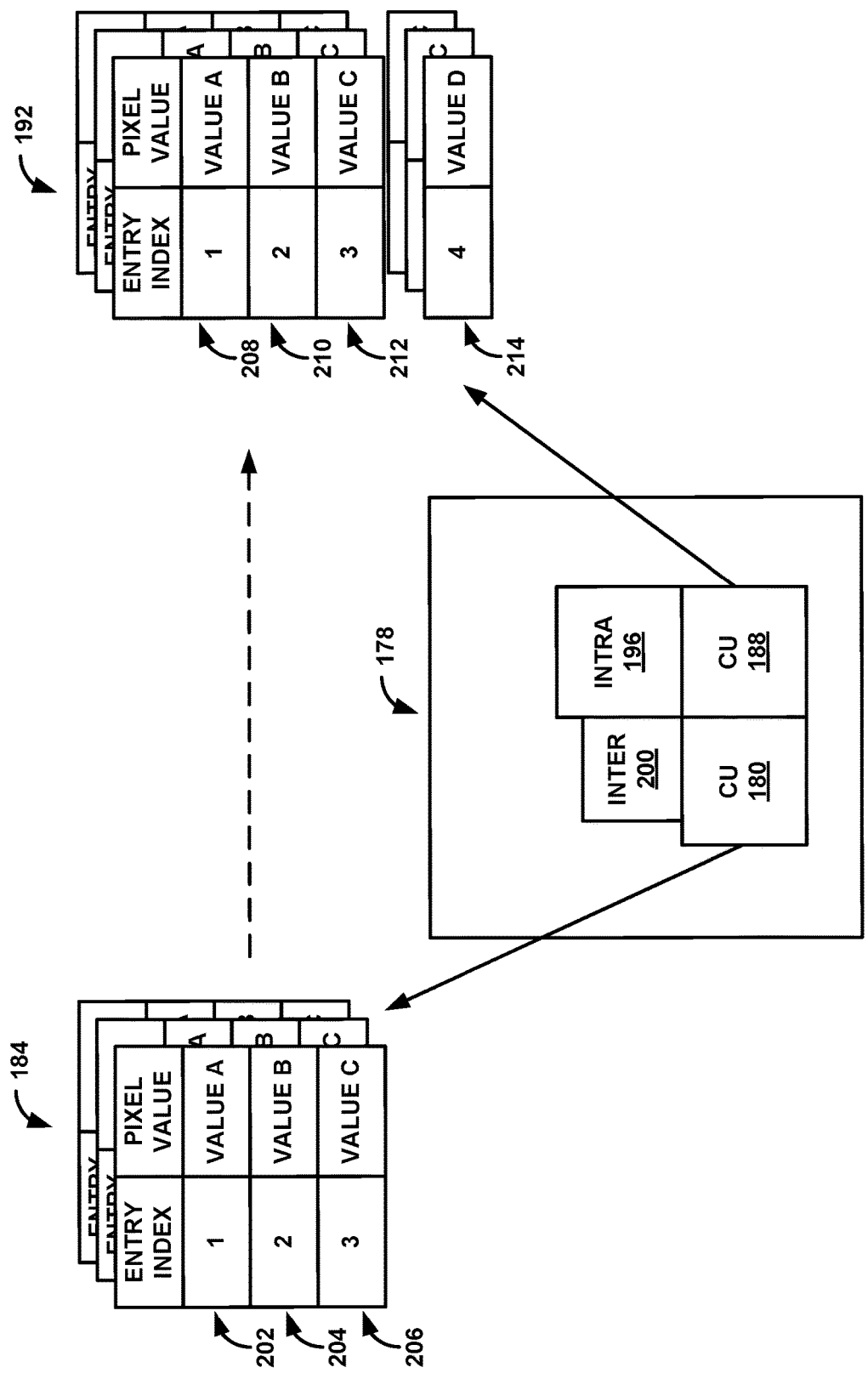
FIG. 2 is a conceptual diagram illustrating palette mode video coding.

FIG. 2 is a conceptual diagram illustrating an example of determining a palette for coding video data, consistent with techniques of this disclosure. The example of FIG. 2 includes a picture 178 having a first coding unit (CU) 180 that is associated with a first set of palettes (i.e., first palettes 184) and a second CU 188 that is associated with a second set of palettes (i.e., second palettes 192). As described in greater detail below and in accordance with one or more of the techniques of this disclosure, second palettes 192 are based on first palettes 184. Picture 178 also includes block 196 coded with an intra-prediction coding mode and block 200 that is coded with an inter-prediction coding mode.

The techniques of FIG. 2 are described in the context of video encoder 20 (FIG. 1 and FIG. 5) and video decoder 30 (FIG. 1 and FIG. 6) and with respect to the HEVC video coding standard for purposes of explanation. With respect to the HEVC framework, as an example, the palette-based coding techniques may be configured to be used as a CU mode. In other examples, the palette-based coding techniques may be configured to be used as a PU mode or a TU mode in the framework of HEVC. Accordingly, all of the following disclosed processes described in the context of a CU mode may, additionally or alternatively, apply to a PU or a TU. However, it should be understood that the techniques of this disclosure are not limited in this way, and may be applied by other video coding processors and/or devices in other video coding processes and/or standards.

In general, a palette refers to a number of pixel values that are dominant and/or representative for a CU currently being coded (e.g., CU 188 in the example of FIG. 2). First palettes 184 and second palettes 192 are shown as including multiple palettes. In some examples, according to aspects of this disclosure, a video coder (such as video encoder 20 or video decoder 30) may code palettes separately for each color component of a CU. For example, video encoder 20 may encode a palette for a luma (Y) component of a CU, another palette for a chroma (U) component of the CU, and yet another palette for the chroma (V) component of the CU. In this example, entries of the Y palette may represent Y values of pixels of the CU, entries of the U palette may represent U values of pixels of the CU, and entries of the V palette may represent V values of pixels of the CU.

In other examples, video encoder 20 may encode a single palette for all color components of a CU. In this example, video encoder 20 may encode a palette having an i-th entry that is a triple value, including $Y_i$, $U_i$, and $V_i$. In this case, each entry in the palette includes values for each of the components of the pixels. Accordingly, the representation of palettes 184 and 192 as a set of palettes having multiple individual palettes is merely one example and not intended to be limiting. Except where stated to the contrary, the techniques described below with respect to FIG. 2 are equally applicable to palettes that use triple values as they are to palettes that use single values.

In the example of FIG. 2, each of first palettes 184 includes three entries 202-206 having entry index value 1, entry index value 2, and entry index value 3, respectively. Entries 202-206 relate the index values to pixel values including pixel value A, pixel value B, and pixel value C, respectively. It should be noted that each of first palettes 184 do not actually include the indices and column headers, but only include the pixel values A, B and C and the indices are used to identify the entries in the palette.

As described herein, rather than coding the actual pixel values of first CU 180, a video coder (such as video encoder 20 or video decoder 30) may use palette-based coding to code the pixels of the block using the indices 1-3. That is, for each pixel position of first CU 180, video encoder 20 may encode an index value for the pixel, where the index value is associated with a pixel value in one or more of first palettes 184. Video decoder 30 may obtain the index values from a bitstream and may reconstruct the pixel values using the index values and one or more of first palettes 184. In other words, for each respective index value for a block, video decoder 30 may determine an entry in one of first palettes 184. Video decoder 30 may replace the respective index value in the block with the pixel value specified by the determined entry in the palette. Video encoder 20 may transmit first palettes 184 in an encoded video data bitstream for use by video decoder 30 in palette-based decoding. In general, one or more palettes may be transmitted for each CU or may be shared among different CUs.

Video encoder 20 and video decoder 30 may determine second palettes 192 based on first palettes 184. For example, video encoder 20 may encode a pred_palette_flag for each CU (including, as an example, second CU 188) to indicate whether the palette for the CU is predicted from one or more palettes associated with one or more other CUs, such as neighboring CUs (spatially or based on scan order) or the most frequent samples of a causal neighbor. For example, when the value of such a flag is equal to one, video decoder 30 may determine that second palettes 192 for second CU 188 are predicted from one or more already decoded palettes and therefore no new palettes for second CU 188 are included in a bitstream containing the pred_palette_flag. When such a flag is equal to zero, video decoder 30 may determine that palettes 192 for second CU 188 are included in the bitstream as a new palette. In some examples, pred_palette_flag may be separately coded for each different color component of a CU (e.g., three flags, one for Y, one for U, and one for V, for a CU in YUV video). In other examples, a single pred_palette_flag may be coded for all color components of a CU.

In the example above, the pred_palette_flag is signaled per-CU to indicate if the palette for a current CU is the same as a palette for a previous CU. If the value of pred_palette_flag is true, then second palettes 192 are identical to first palettes 184 and no additional information is signaled. In other examples, one or more syntax elements may be signaled on a per-entry basis. That is, a flag may be signaled for each entry of a palette predictor to indicate whether that entry is present in the current palette. As noted above, if a palette entry is not predicted, the palette entry may be explicitly signaled. In other examples, these two methods could be combined. For example, first the pred_palette_flag is signaled. If the flag is 0, a per-entry prediction flag may be signaled. In addition, the number of new entries and their explicit values may be signaled. As will be explained in greater detail below, according to the techniques of this disclosure, the values of new entries may be signaled as difference information between the actual values of the new entries and the values of a predictor sample.

When determining second palettes 192 relative to first palettes 184 (e.g., pred_palette_flag is equal to one), video encoder 20 and/or video decoder 30 may locate one or more blocks from which the predictive palettes, in this example first palettes 184, are determined. The predictive palettes may be associated with one or more neighboring CUs of the CU currently being coded (e.g., such as neighboring CUs (spatially or based on scan order) or the most frequent samples of a causal neighbor), i.e., second CU 188. The palettes of the one or more neighboring CUs may be associated with a predictive palette. In some examples, such as the example illustrated in FIG. 2, video encoder 20 and/or video decoder 30 may locate a left neighboring CU, first CU 180, when determining a predictive palette for second CU 188. In other examples, video encoder 20 and/or video decoder 30 may locate one or more CUs in other positions relative to second CU 188, such as an upper CU, CU 196. In another example, the palette for the last CU in scan order that used the palette mode may be used as a predictive palette.

Video encoder 20 and/or video decoder 30 may determine a CU for palette prediction based on a hierarchy. For example, video encoder 20 and/or video decoder 30 may initially identify the left neighboring CU, first CU 180, for palette prediction. If the left neighboring CU is not available for prediction (e.g., the left neighboring CU is coded with a mode other than a palette-based coding mode, such as an intra-prediction more or intra-prediction mode, or is located at the left-most edge of a picture or slice) video encoder 20 and/or video decoder 30 may identify the upper neighboring CU, CU 196. Video encoder 20 and/or video decoder 30 may continue searching for an available CU according to a predetermined order of locations until locating a CU having a palette available for palette prediction. In some examples, video encoder 20 and/or video decoder 30 may determine a predictive palette based on multiple blocks and/or reconstructed samples of a neighboring block.

While the example of FIG. 2 illustrates first palettes 184 as predictive palettes from a single CU, (i.e., first CU 180), in other examples, video encoder 20 and/or video decoder 30 may locate palettes for prediction from a combination of neighboring CUs. For example, video encoder 20 and/or video decoder may apply one or more formulas, functions, rules or the like to generate a predictive palette based on palettes of one or a combination of a plurality of neighboring CUs (spatially or in scan order).

In still other examples, video encoder 20 and/or video decoder 30 may construct a candidate list including a number of potential candidates for palette prediction. In such examples, video encoder 20 may encode an index to the candidate list to indicate the candidate CU in the list from which the current CU used for palette prediction is selected (e.g., copies the palette). Video decoder 30 may construct the candidate list in the same manner, decode the index, and use the decoded index to select the palette of the corresponding CU for use with the current CU. In another example, the palette of the indicated candidate CU in the list may be used as a predictive palette for per-entry prediction of a current palette for the current CU.

In an example for purposes of illustration, video encoder 20 and video decoder 30 may construct a candidate list that includes one CU that is positioned above the CU currently being coded and one CU that is positioned to the left of the CU currently being coded. In this example, video encoder 20 may encode one or more syntax elements to indicate the candidate selection. For example, video encoder 20 may encode a flag having a value of zero to indicate that the palette for the current CU is copied from the CU positioned to the left of the current CU. Video encoder 20 may encode the flag having a value of one to indicate that the palette for the current CU is copied from the CU positioned above the current CU. Video decoder 30 decodes the flag and selects the appropriate CU for palette prediction. In another example, the flag may indicate whether the palette of the top or left neighboring CU is used as a predictive palette. Then, for each entry in the predictive palette, it may be indicated whether that entry is used in the palette for the current CU.

In still other examples, video encoder 20 and/or video decoder 30 determine the palette for the CU currently being coded based on the frequency with which sample values included in one or more other palettes occur in one or more neighboring CUs. For example, video encoder 20 and/or video decoder 30 may track the colors associated with the most frequently used index values during coding of a predetermined number of CUs. Video encoder 20 and/or video decoder 30 may include the most frequently used colors in the palette for the CU currently being coded.

As noted above, in some examples, video encoder 20 and/or video decoder may copy an entire palette from a neighboring CU for coding a current CU. Additionally or alternatively, video encoder 20 and/or video decoder 30 may perform entry-wise based palette prediction. For example, video encoder 20 may encode one or more syntax elements for each entry of a palette indicating whether the respective entries are predicted based on a predictive palette (e.g., a palette of another CU). In this example, video encoder 20 may encode a flag having a value of one for a given entry when the entry is a predicted value from a predictive palette (e.g., a corresponding entry of a palette associated with a neighboring CU). Video encoder 20 may encode a flag having a value of zero for a particular entry to indicate that the particular entry is not predicted from a palette of another CU. In this example, video encoder 20 may also encode additional data indicating the value of the non-predicted palette entry.

This disclosure describes several alternative techniques for predicting a palette for a current CU. In one example, a predictive palette that includes palette entries from one or more previously coded neighboring CUs includes a number of entries, N. In this case, video encoder 20 first transmits a binary vector, V, having the same size as the predictive palette, i.e., size N, to video decoder 30. Each entry in the binary vector indicates whether the corresponding entry in the predictive palette will be reused or copied to the palette for the current CU. For example, V(i)=1 means that the i-th entry in the predictive palette for the neighboring CU will be reused or copied to the palette for the current CU, which may have a different index in the current CU.

In addition, video encoder 20 may transmit a number, M, that indicates how many new palette entries are included in the palette for the current CU, and then transmits a pixel value for each of the new palette entries to video decoder 30. In this example, the final size of the palette for the current CU may be derived as equal to M+S, where S is the number of entries in the predictive palette that may be reused or copied to the palette for the current CU (i.e., V(i)=1). To generate the palette for the current CU, video decoder 30 may merge the transmitted new palette entries and the copied palette entries reused from the predictive palette. In some cases, the merge may be based on the pixel values, such that the entries in the palette for the current CU may increase (or decrease) with the palette index. In other cases, the merge may be a concatenation of the two sets of entries, i.e., the new palette entries and the copied palette entries.

In another example, video encoder 20 first transmits an indication of a size of a palette, N, for a current CU to video decoder 30. Video encoder 20 then transmits a vector, V, having the same size as the palette for the current CU, i.e., size N, to video decoder 30. Each entry in the vector indicates whether the corresponding entry in the palette for the current CU is explicitly transmitted by video encoder 20 or copied from a predictive palette. For example, V(i)=1 means that video encoder 20 transmits the i-th entry in the palette to video decoder 30, and V(i)=0 means that the i-th entry in the palette is copied from the predictive palette. For the entries that are copied from the predictive palette (i.e., V(i)=0), video encoder 20 may use different methods to signal which entry in the predictive palette is used in the palette for the current CU. In some cases, video encoder 20 may signal the palette index of the entry to be copied from the predictive palette to the palette for the current CU. In other cases, video encoder 20 may signal an index offset, which is the difference between the index in the palette for the current CU and the index in the predictive palette.

In the two above examples, the one or more previously coded neighboring CUs used to generate the predictive palette used for prediction of the palette for the current CU may be a top-neighboring (i.e., upper) CU or a left-neighboring CU with respect to the current CU. In some examples, a candidate list of neighboring CUs may be constructed, and video encoder 20 transmits an index to indicate which candidate neighboring CUs and associated palettes are used for palette prediction for the current CU. For certain CUs, e.g., CUs that are positioned at a beginning of a slice or at other slice boundaries or leftmost CUs in the slice or a picture of video data, palette prediction may be disabled.

In an additional example, video encoder 20 transmits an indication of a number of entries included in a palette for a current CU to video decoder 30. Then, for each of the palette entries, video encoder 20 transmits a flag or other syntax element to indicate whether the palette entry is explicitly transmitted by video encoder 20 or whether it is derived from a previously reconstructed pixel. For example, a one-bit flag set equal to 1 may mean that video encoder 20 explicitly sends the palette entry, and the one-bit flag set equal to 0 may mean that the palette entry is derived from a previously reconstructed pixel. For each of the palette entries that are derived from a previously reconstructed pixel, video encoder 20 transmits another indication regarding a pixel location of the reconstructed pixel in the current CU or a neighboring CU that corresponds to the palette entry. In some cases, the reconstructed pixel location indication may be a displacement vector with respect to the top-left position of the current CU. In other cases, the reconstructed pixel location indication may be an index into a list of reconstructed pixels that can be used for specifying the palette entry for the current CU. For example, this list may include all the reference pixels that may be used for normal intra prediction in HEVC.

In the example of FIG. 2, second palettes 192 includes four entries 208-214 having entry index value 1, entry index value 2, entry index value 3, and entry index 4, respectively. Entries 208-214 relate the index values to pixel values including pixel value A, pixel value B, pixel value C, and pixel value D, respectively. According to one or more aspects of this disclosure, video encoder 20 and/or video decoder 30 may use any of the above-described techniques to locate first CU 180 for purposes of palette prediction and copy entries 1-3 of first palettes 184 to entries 1-3 of second palettes 192 for coding second CU 188. In this way, video encoder 20 and/or video decoder 30 may determine second palettes 192 based on first palettes 184. In addition, video encoder 20 and/or video decoder 30 may code data for entry 4 to be included with second palettes 192. Such information may include the number of palette entries not predicted from a predictive palette and the pixel values corresponding to those palette entries.

In some examples, according to aspects of this disclosure, one or more syntax elements may indicate whether palettes, such as second palettes 192, are predicted entirely from a predictive palette (shown in FIG. 2 as first palettes 184, but which may be composed of entries from one or more blocks) or whether particular entries of second palettes 192 are predicted. For example, an initial syntax element may indicate whether all of the entries are predicted. If the initial syntax element indicates that not all of the entries are predicted (e.g., a flag having a value of 0), one or more additional syntax elements may indicate which entries of second palettes 192 are predicted from the predictive palette.

According to some aspects of this disclosure, certain information associated with palette prediction may be inferred from one or more characteristics of the data being coded. That is, rather than video encoder 20 encoding syntax elements (and video decoder 30 decoding such syntax elements), video encoder 20 and video decoder 30 may perform palette prediction based on one or more characteristics of the data being coded.

In an example, for purposes of illustration, the value of pred_palette_flag, described above, may be inferred from one or more of, as examples, the size of the CU being coded, the frame type, the color space, the color component, the frame size, the frame rate, the layer id in scalable video coding or the view id in multi-view coding. That is, with respect to the size of the CU as an example, video encoder 20 and/or video decoder 30 may determine that the above-described pred_palette_flag is equal to one for any CUs that exceed or are less than a predetermined size. In this example, the pred_palette_flag does not need to be signaled in the encoded bitstream.

While described above with respect to the pred_palette_flag, video encoder 20 and/or video decoder 30 may also or alternatively infer other information associated with palette prediction, such as the candidate CU from which the palette is used for prediction, or rules for constructing palette prediction candidates, based on one or more characteristics of the data being coded.

According to other aspects of this disclosure, video encoder 20 and/or video decoder 30 may construct a palette on-the-fly. For example, when initially coding second CU 188, there are no entries in palettes 192. As video encoder 20 and video decoder 30 code new values for pixels of second CU 188, each new value is included in palettes 192. That is, for example, video encoder 20 adds pixel values to palettes 192 as the pixel values are generated and signaled for positions in CU 188. As video encoder 20 encodes pixels relatively later in the CU, video encoder 20 may encode pixels having the same values as those already included in the palette using index values rather than signaling the pixel values. Similarly, when video decoder 30 receives a new pixel value (e.g., signaled by video encoder 20) for a position in second CU 188, video decoder 30 includes the pixel value in palettes 192. When pixel positions that are decoded relatively later in second CU 188 have pixel values that have been added to second palettes 192, video decoder 30 may receive information such as, e.g., index values, that identify the corresponding pixel values in second palettes 192 for reconstruction of the pixel values of second CU 188.

In some examples, as described in greater detail below, video encoder 20 and/or video decoder 30 may maintain palettes 184 and 192 at or below a maximum palette size. According to aspects of this disclosure, if a maximum palette size is reached, e.g., as second palettes 192 are constructed dynamically on-the-fly, then video encoder 20 and/or video decoder 30 perform the same process to remove an entry of second palettes 192. One example process for removing palette entries is a first-in-first-out (FIFO) technique in which video encoder 20 and video decoder 30 remove the oldest entry of a palette. In another example, video encoder 20 and video decoder 30 may remove the least frequently used palette entry from the palette. In still another example, video encoder 20 and video decoder 30 may weight both FIFO and frequency of use processes to determine which entry to remove. That is, removal of an entry may be based on how old the entry is and how frequently it is used.

According to some aspects, if an entry (pixel value) is removed from a palette and the pixel value occurs again at a later position in the CU being coded, video encoder 20 may encode the pixel value instead of including an entry in the palette and encoding an index. Additionally or alternatively, video encoder 20 may re-enter palette entries into the palette after having been removed, e.g., as video encoder 20 and video decoder 30 scan the positions in the CU.

In some examples, the techniques for deriving a palette on-the-fly may be combined with one or more other techniques for determining a palette. In particular, as an example, video encoder 20 and video decoder 30 may initially code second palettes 192 (e.g., using palette prediction to predict second palettes 192 from first palettes 184) and may update second palettes 192 when coding pixels of second CU 188. For example, upon transmitting the initial palette, video encoder 20 may add values to the initial palette or change values in the initial palette as pixel values of additional locations in the CU are scanned. Likewise, upon receiving an initial palette, video decoder 30 may add (i.e., include) values to the initial palette or change values in the initial palette as pixel values of additional locations in the CU are scanned.

Video encoder 20 may, in some examples, signal whether the current CU uses transmission of an entire palette, or on-the-fly palette generation, or a combination of transmission of an initial palette with updating of the initial palette by on-the-fly derivation. In some examples, the initial palette may be a full palette at maximum palette size, in which case values in the initial palette may be changed. In other examples, the initial palette may be smaller than the maximum palette size, in which cases video encoder 20 and video decoder 30 may add values to and/or change values of the initial palette.

According to one or more aspects of this disclosure, the size of palettes, such as first palettes 184 and second palettes 192, e.g., in terms of the number of pixel values that are included in the palette may be fixed or may be signaled using one or more syntax elements in an encoded bitstream. For example, according to some aspects, video encoder 20 and video decoder 30 may use unary codes or truncated unary codes (e.g., codes that truncate at a maximum limit of the palette size) to code the palette size. According to other aspects, video encoder 20 and video decoder 30 may use Exponential-Golomb or Rice-Golomb codes to code the palette size.

According to still other aspects, video encoder 20 and video decoder 30 may code data indicating the size of the palette after each entry of the palette. With respect to second palettes 192 as an example, video encoder 20 may encode a stop flag after each of entries 208-214. In this example, a stop flag equal to one may specify that the entry currently being coded is the final entry of second palettes 192, while a stop flag equal to zero may indicate that there are additional entries in second palettes 192. Accordingly, video encoder 20 may encode stop flags having a value of zero after each of entries 208-212 and a stop flag having a value of one after entry 214. In some instances, the stop flag may not be included in the bitstream upon the constructed palette reaching a maximum palette size limit. While the examples above disclose techniques for explicitly signaling the size of palettes, in other examples, the size of palettes may also be conditionally transmitted or inferred based on so-called side information (e.g., characteristic information such as the size of the CU being coded, the frame type, the color space, the color component, the frame size, the frame rate, the layer id in scalable video coding or the view id in multi-view coding, as noted above).

The techniques of this disclosure include coding data losslessly, or, alternatively, with some losses (lossy coding). For example, with respect to lossy coding, video encoder 20 may code the pixels of a CU without exactly matching the pixel values of palettes exactly to the actual pixel values in the CU. When the techniques of this disclosure are applied to lossy coding, some restrictions may be applied to the palette. For example, video encoder 20 and video decoder 30 may quantize palettes, such as first palettes 184 and second palettes 192. That is, video encoder 20 and video decoder 30 may merge or combine (i.e., quantize) entries of a palette when the pixel values of the entries are within a predetermined range of each other. In other words, if there is already a palette value that is within an error margin of a new palette value, the new palette value is not added to the palette. In another example, a plurality of different pixel values in a block may be mapped to a single palette entry, or, equivalently, to a single palette pixel value.

Video decoder 30 may decode pixel values in the same manner, regardless of whether a particular palette is lossless or lossy. As one example, video decoder 30 may use an index value transmitted by video encoder 20 for a given pixel position in a coded block to select an entry in the palette for the pixel position, without regard to whether the palette is lossless or lossy. In this example, the pixel value of the palette entry is used as the pixel value in the coded block, whether it matches the original pixel value exactly or not.

In an example of lossy coding, for purposes of illustration, video encoder 20 may determine an error bound, referred to as a delta value. A candidate pixel value entry Plt_cand may correspond to a pixel value at a position in a block to be coded, such as CU or PU. During construction of the palette, video encoder 20 determines the absolute difference between the candidate pixel value entry Plt_cand and all of the existing pixel value entries in the palette. If all of the absolute differences between the candidate pixel value entry Plt_cand and the existing pixel value entries in the palette are larger than the delta value, video encoder 20 may add the pixel value candidate to the palette as an entry. If an absolute difference between the pixel value entry Plt_cand and at least one existing pixel value entry in the palette is equal to or smaller than the delta value, video encoder 20 may not add the candidate pixel value entry Plt_cand to the palette. Thus, when coding the pixel value entry Plt_cand, video encoder 20 may select the entry with the pixel value that is the closest to the pixel value entry Plt_cand, thereby introducing some loss into the system. When a palette consists of multiple components (e.g. three color components), the sum of absolute difference of individual component values may be used for comparison against the delta value. Alternatively or additionally, the absolute difference for each component value may be compared against a second delta value.

In some examples, the existing pixel value entries in the palette noted above may have been added using a similar delta comparison process. In other examples, the existing pixel values in the palette may have been added using other processes. For example, one or more initial pixel value entries may be added to a palette (without a delta comparison) to start the delta comparison process of constructing the palette. The process described above may be implemented by video encoder 20 and/or video decoder 30 to produce luma and/or chroma palettes.

The techniques described above with respect to palette construction may also be used by video encoder 20 and video decoder 30 during pixel coding. For example, when encoding of a pixel value, video encoder 20 may compare the value of the pixel with the pixel values of entries in the palette. If the absolute pixel value difference between the value of the pixel and one of the entries in the palette is equal to or smaller than a delta value, video encoder 20 may encode the pixel value as the entry of the palette. That is, in this example, video encoder 20 encodes the pixel value using one of the entries of the palette when the pixel value produces a sufficiently small (e.g., within a predetermined range) absolute difference versus the palette entry.

In some examples, video encoder 20 may select the palette entry that yields the smallest absolute pixel value difference (compared to the pixel value being coded) to encode the pixel value. As an example, video encoder 20 may encode an index to indicate a palette entry that will be used for the pixel value, e.g., the palette pixel value entry that will be used to reconstruct the coded pixel value at video decoder 30. If the absolute pixel value difference between the value of the pixel and all of the entries in the palette is greater than delta, the encoder may not use one of the palette entries to encode the pixel value, and instead may transmit the pixel value of the pixel (possibly after quantization) to video decoder 30 (and possibly add the pixel value as an entry to the palette).

In another example, video encoder 20 may select an entry of a palette for encoding a pixel value. Video encoder 20 may use the selected entry as a predictive pixel value. That is, video encoder 20 may determine a residual value representing a difference between the actual pixel value and the selected entry and encode the residue. Video encoder 20 may generate residual values for pixels in a block that are predicted by entries of a palette, and may generate a residue block including respective residual pixel values for the block of pixels. Video encoder 20 may subsequently apply transformation and quantization (as noted above with respect to FIG. 2) to the residue block. In this manner, video encoder 20 may generate quantized residual transform coefficients. In another example, the residue may be coded losslessly (without transform and quantization) or without transform.

Video decoder 30 may inverse transform and inverse quantize the transform coefficients to reproduce the residual block. Video decoder 30 may then reconstruct a pixel value using the predictive palette entry value and the residual value for the pixel value. For example, video decoder 30 may combine the residual value with the palette entry value to reconstruct the coded pixel value.

In some examples, the delta value may be different for different CU sizes, picture sizes, color spaces or different color components. The delta value may be predetermined or determined based on various coding conditions. For example, video encoder 20 may signal the delta value to video decoder 30 using high level syntax, such as syntax in PPS, SPS, VPS and/or slice header. In other examples, video encoder 20 and video decoder 30 may be preconfigured to use the same, fixed delta value. In still other examples, video encoder 20 and/or video decoder 30 may adaptively derive the delta value based on side information (e.g., such as CU size, color space, color component, or the like, as noted above).

In some examples, a lossy coding palette mode may be included as an HEVC coding mode. For example, coding modes may include an intra-prediction mode, an inter-prediction mode, a lossless coding palette mode, and a lossy coding palette mode. In HEVC coding, as noted above with respect to FIGS. 2 and 3, a quantization parameter (QP) is used to control the allowed distortion. The value of delta for palette-based coding may be calculated or otherwise determined as a function of QP.

Generation of a palette using the lossy coding techniques described in this disclosure may be performed by video encoder 20, video decoder 30 or both. For example, video encoder 20 may generate entries in a palette for a CU using the delta comparison techniques described above and signal information for construction of the palette for use by video decoder 30. That is, video encoder 20 may be configured to signal information indicating pixel values for entries in a palette for a CU, and then encode pixel values using the pixel values associated with such palette entries. Video decoder 30 may construct a palette using such information, and may then use the entries to decode pixel values of a coded block. In some examples, video encoder 20 may signal index values that identify palette entries for one or more pixel positions of the coded block, and video decoder 30 may use the index values to retrieve the pertinent pixel value entries from the palette.

In other examples, video decoder 30 may be configured to construct a palette by applying the delta comparison techniques described above. For example, video decoder 30 may receive pixel values for positions within a coded block and may determine whether absolute differences between the pixel values and the existing pixel value entries in the palette are larger than a delta value. If so, video decoder 30 may add the pixel values as entries in the palette, e.g., for later use in palette-based decoding of pixel values for other pixel positions of the block using corresponding index values signaled by video encoder 20. In this case, video encoder 20 and video decoder 30 apply the same or similar processes to generate the palette. If not, video decoder 30 may not add the pixel value to the palette.

In an example for purposes of illustration, video decoder 30 may receive index values or pixel values for various pixel positions in a block. If an index value is received for a pixel position, for example, video decoder 30 may use the index value to identify an entry in the palette, and use the pixel value of the palette entry for the pixel position. If a pixel value is received for the pixel position, video decoder 30 may use the received pixel value for the pixel position, and may also apply the delta comparison to determine whether the pixel value should be added to the palette and then later used for palette coding.

On the encoder side, if a pixel value for a position in a block produces an absolute difference between the pixel value and an existing pixel value entry in the palette that is less than or equal to the delta value, video encoder 20 may send an index value to identify the entry in the palette for use in reconstructing the pixel value for that position. If a pixel value for a position in a block produces absolute difference values between the pixel value and the existing pixel value entries in the palette that are all greater than the delta value, video encoder 20 may send the pixel value and may add the pixel value as a new entry in the palette. To construct the palette, video decoder 30 may use delta values signaled by the encoder, rely on a fixed or known delta value, or infer or derive a delta value, e.g., as described above.

As noted above, video encoder 20 and/or video decoder 30 may use coding modes including an intra-prediction mode, an inter-prediction mode, a lossless coding palette mode, and a lossy coding palette mode when coding video data. According to some aspects of this disclosure, video encoder 20 and video decoder 30 may code one or more syntax elements indicating whether palette-based coding is enabled. For example, at each CU, video encoder 20 may encode a syntax element, such as a flag PLT_Mode_flag. The PLT_Mode_flag or other syntax element may indicate whether a palette-based coding mode is to be used for a given CU (or a PU in other examples). For example, this flag may be signaled in an encoded video bitstream at the CU level, and then received by video decoder 30 upon decoding the encoded video bitstream.

In this example, a value of this PLT_Mode_flag equal to 1 may specify that the current CU is encoded using a palette-based coding mode. In this case, video decoder 30 may apply the palette-based coding mode to decode the CU. In some examples, a syntax element may indicate one of a plurality of different palette-based coding modes for the CU (e.g., lossy or lossless). A value of this PLT_Mode_flag equal to 0 may specify that the current CU is encoded using a mode other than palette mode. For example, any of a variety of inter-predictive, intra-predictive, or other coding modes may be used. When a value of PLT_Mode_flag is 0, video encoder 20 may also encode additional data to indicate the specific mode used for encoding the respective CU (e.g., an HEVC coding mode). The use of the PLT_Mode_flag is described for purposes of example. In other examples, however, other syntax elements such as multi-bit codes may be used to indicate whether the palette-based coding mode is to be used for a CU (or PU in other examples) or to indicate which of a plurality of modes are to be used for coding.

In some examples, the above-described flag or other syntax elements may be transmitted at a higher level than the CU (or PU) level. For example, video encoder 20 may signal such a flag at a slice level. In this case, a value equal to 1 indicates that all of the CUs in the slice are encoded using palette mode. In this example, no additional mode information, e.g., for palette mode or other modes, is signaled at the CU level. In another example, video encoder 20 may signal such a flag in a PPS, SPS or VPS.

According to some aspects of this disclosure, video encoder 20 and/or video decoder 30 may code one or more syntax elements (e.g., such as the above-described flag) at one of the slice, PPS, SPS, or VPS levels specifying whether the palette mode is enabled or disabled for the particular slice, picture, sequence or the like, while the PLT_Mode_flag indicates whether the palette-based coding mode is used for each CU. In this case, if a flag or other syntax element sent at the slice, PPS, SPS or VPS level indicates that palette coding mode is disabled, in some examples, there may be no need to signal the PLT_Mode_flag for each CU. Alternatively, if a flag or other syntax element sent at the slice, PPS, SPS or VPS level indicates that palette coding mode is enabled, the PLT_Mode_flag may be further signaled to indicate whether the palette-based coding mode is to be used for each CU. Again, as mentioned above, application of these techniques for indicating palette-based coding of a CU could additionally or alternatively be used to indicate palette-based coding of a PU.

In some examples, the above-described syntax elements may be conditionally signaled in the bitstream. For example, video encoder 20 and video decoder 30 may only encode or decode, respectively, the syntax elements based on the size of the CU, the frame type, the color space, the color component, the frame size, the frame rate, the layer id in scalable video coding or the view id in multi-view coding.

While the examples described above relate to explicit signaling, e.g., with one or more syntax elements in a bitstream, in other examples, video encoder 20 and/or video decoder 30 may implicitly determine whether a palette coding mode is active and/or used for coding a particular block. Video encoder 20 and video decoder 30 may determine whether palette-based coding is used for a block based on, for example, the size of the CU, the frame type, the color space, the color component, the frame size, the frame rate, the layer id in scalable video coding or the view id in multi-view coding.

While the techniques of FIG. 2 are described above in the context of CUs (HEVC), it should be understood that the techniques may also be applied to prediction units (PUs) or in other video coding processes and/or standards.

Figure 3:
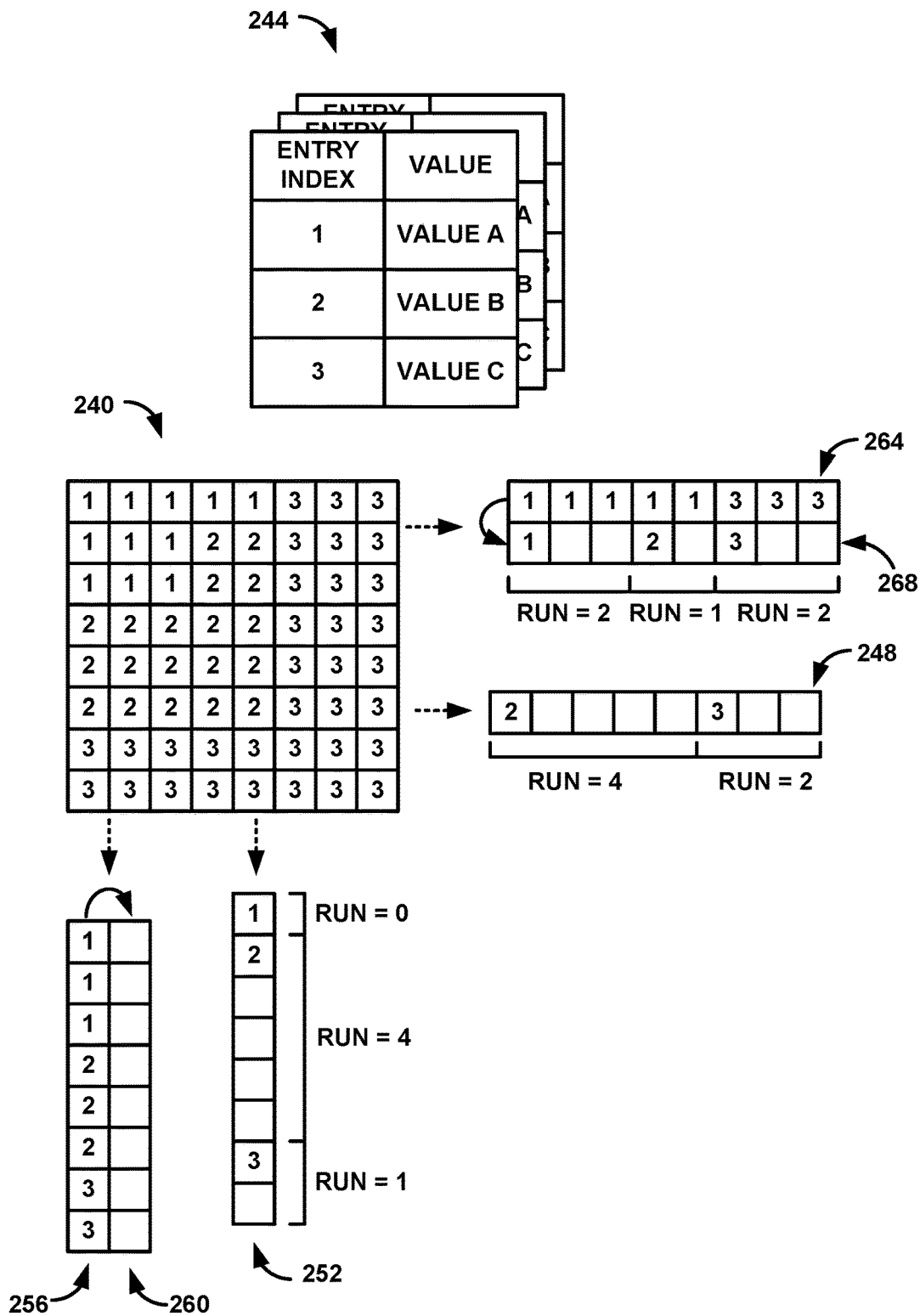
FIG. 3 is a conceptual diagram illustrating an example of determining a palette for coding video data, consistent with techniques of this disclosure.

FIG. 3 is a conceptual diagram illustrating examples of determining indices to a palette for a video block, consistent with techniques of this disclosure. For example, FIG. 3 includes a map 240 of index values (values 1, 2, and 3) that relate respective positions of pixels associated with the index values to an entry of palettes 244. Palettes 244 may be determined in a similar manner as first palettes 184 and second palettes 192 described above with respect to FIG. 2.

Again, the techniques of FIG. 3 are described in the context of video encoder 20 (FIG. 1 and FIG. 6) and video decoder 30 (FIG. 1 and FIG. 7) and with respect to the HEVC video coding standard for purposes of explanation. However, it should be understood that the techniques of this disclosure are not limited in this way, and may be applied by other video coding processors and/or devices in other video coding processes and/or standards.

While map 240 is illustrated in the example of FIG. 3 as including an index value for each pixel position, it should be understood that in other examples, not all pixel positions may be associated with an index value that indicates an entry of palettes 244 that specify the pixel value of the block. That is, as noted above, in some examples, video encoder 20 may encode (and video decoder 30 may obtain, from an encoded bitstream) an indication of an actual pixel value (or its quantized version) for a position in map 240 if the pixel value is not included in palettes 244.

In some examples, video encoder 20 and video decoder 30 may be configured to code an additional map indicating which pixel positions are associated with index values. For example, assume that the (i, j) entry in the map corresponds to the (i, j) position of a CU. Video encoder 20 may encode one or more syntax elements for each entry of the map (i.e., each pixel position) indicating whether the entry has an associated index value. For example, video encoder 20 may encode a flag having a value of one to indicate that the pixel value at the (i, j) location in the CU is one of the values in palettes 244. Video encoder 20 may, in such an example, also encode a palette index (shown in the example of FIG. 3 as values 1-3) to indicate that pixel value in the palette and to allow video decoder to reconstruct the pixel value. In instances in which palettes 244 include a single entry and associated pixel value, video encoder 20 may skip the signaling of the index value. Video encoder 20 may encode the flag to have a value of zero to indicate that the pixel value at the (i, j) location in the CU is not one of the values in palettes 244. In this example, video encoder 20 may also encode an indication of the pixel value for use by video decoder 30 in reconstructing the pixel value. In some instances, the pixel value may be coded in a lossy manner.

The value of a pixel in one position of a CU may provide an indication of values of one or more other pixels in other positions of the CU. For example, there may be a relatively high probability that neighboring pixel positions of a CU will have the same pixel value or may be mapped to the same index value (in the case of lossy coding, in which more than one pixel value may be mapped to a single index value).

According to aspects of this disclosure, video encoder 20 may encode one or more syntax elements indicating a number of consecutive pixels or index values in a given scan order that have the same pixel value or index value. As noted above, the string of like-valued pixel or index values may be referred to herein as a run. In an example for purposes of illustration, if two consecutive pixels or indices in a given scan order have different values, the run is equal to zero. If two consecutive pixels or indices in a given scan order have the same value but the third pixel or index in the scan order has a different value, the run is equal to one. For three consecutive indices or pixels with the same value, the run is two, and so forth. Video decoder 30 may obtain the syntax elements indicating a run from an encoded bitstream and use the data to determine the number of consecutive locations that have the same pixel or index value.

In some examples, all pixel locations in the current CU having pixel values that are in the palette for the current CU are encoded with a palette index followed by a "run" of the pixel value at consecutive pixel locations. In the case where there is only one entry in the palette, the transmission of the palette index or the "run" may be skipped for the current CU. In the case where the pixel value at one of the pixel locations in the current CU does not have an exact match to a pixel value in the palette, video encoder 20 may select one of the palette entries having the closest pixel value and may calculate a prediction error or residual value between the original pixel value and the prediction pixel value included in the palette. Video encoder 20 encodes and transmits the residual value for the pixel location to the video decoder. Video decoder 30 may then derive a pixel value at the pixel location based on the corresponding received palette index, and the derived pixel value and the residual value are then used to predict the original pixel value at the pixel location in the current CU. In one example, the residual value may be encoded using an HEVC method, such as applying a RQT to transform the residual value, quantize the transform coefficients, and entropy encode the quantized transform coefficients. In some cases, the above example may be referred to as lossy coding.

In an example for purposes of illustration, consider line 248 of map 240. Assuming a horizontal, left to right scan direction, line 248 includes five index values of "2" and three index values of "3." According to aspects of this disclosure, video encoder 20 may encode an index value of 2 for the first position of line 248 in the scan direction. In addition, video encoder 20 may encode one or more syntax elements indicating the run of consecutive values in the scan direction that have the same index value as the signaled index value. In the example of line 248, video encoder 20 may signal a run of 4, thereby indicating that the index values of the following four positions in the scan direction share the same index value as the signaled index value. Video encoder 20 may perform the same process for the next different index value in line 248. That is, video encoder 20 may encode an index value of 3 and one or more syntax elements indicating a run of two. Video decoder 30 may obtain the syntax elements indicating the index value and the number of consecutive indices in the scan direction having the same index value (the run).

As noted above, the indices of a map are scanned in a particular order. According to aspects of this disclosure, the scan direction may be vertical, horizontal, or at a diagonal (e.g., 45 degrees or 135 degrees diagonally in block). In some examples, video encoder 20 may encode one or more syntax elements for each block indicating a scan direction for scanning the indices of the block. Additionally or alternatively, the scan direction may be signaled or inferred based on so-called side information such as, for example, block size, color space, and/or color component. Video encoder 20 may specify scans for each color component of a block. Alternatively, a specified scan may apply to all color components of a block.

For example, with respect to a column based scan, consider column 252 of map 240. Assuming a vertical, top to bottom scan direction, column 252 includes one index value of "1," five index values of "2" and two index values of "3." According to aspects of this disclosure, video encoder 20 may encode an index value of 1 for the first position of line 252 in the scan direction (at the relative top of column 252). In addition, video encoder 20 may signal a run of zero, thereby indicating that the index value of the following position in the scan direction is different. Video encoder 20 may then encode an index value of 2 for the next position in the scan direction and one or more syntax elements indicating a run of four, i.e., that the index values of the following four positions in the scan direction share the same index value as the signaled index value. Video encoder 20 may then encode an index value of 3 for the next different index value in the scan direction and one or more syntax elements indicating a run of one. Video decoder 30 may obtain the syntax elements indicating the index value and the number of consecutive indices in the scan direction having the same index value (the run).

According to aspects of this disclosure, video encoder 20 and video decoder 30 may additionally or alternatively perform line copying for one or more entries of map 240. The line copying may depend, in some examples, on the scan direction. For example, video encoder 20 may indicate that a pixel or index value for a particular entry in a map is equal to a pixel or index value in a line above the particular entry (for a horizontal scan) or the column to the left of the particular entry (for a vertical scan). Video encoder 20 may also indicate, as a run, the number of pixel or index values in the scan order that are equal to the entry in the line above or the column to the left of the particular entry. In this example, video encoder 20 and or video decoder 30 may copy pixel or index values from the specified neighboring line and from the specified number of entries for the line of the map currently being coded.

In an example for purposes of illustration, consider columns 256 and 260 of map 240. Assuming a vertical, top to bottom scan direction, column 256 includes three index values of "1," three index values of "2," and two index values of "3." Column 260 includes the same index values having the same order in the scan direction. According to aspects of this disclosure, video encoder 20 may encode one or more syntax elements for column 260 indicating that the entire column 260 is copied from column 256. The one or more syntax elements may be associated with a first entry of column 260 at the relative top of map 240. Video decoder 30 may obtain the syntax elements indicating the line copying and copy the index values of column 256 for column 260 when decoding column 260.

According to aspects of this disclosure, the techniques for coding so-called runs of entries may be used in conjunction with the techniques for line copying described above. For example, video encoder 20 may encode one or more syntax elements (e.g., a flag) indicating whether the value of an entry in a map is obtained from a palette or the value of an entry in the map is obtained from a previously coded line in map 240. Video encoder 20 may also encode one or more syntax elements indicating an index value of a palette or the location of the entry in the line (the row or column). Video encoder 20 may also encode one or more syntax elements indicating a number of consecutive entries that share the same value. Video decoder 30 may obtain such information from an encoded bitstream and may use the information to reconstruct the map and pixel values for a block.

In an example for purposes of illustration, consider rows 264 and 268 of map 240. Assuming a horizontal, left to right scan direction, row 264 includes five index values of "1" and three index values of "3." Row 268 includes three index values of "1," two index values of "2," and three index values of "3." In this example, video encoder 20 may identify particular entries of row 264 followed by a run when encoding data for row 268. For example, video encoder 20 may encode one or more syntax elements indicating that the first position of row 268 (the left most position of row 268) is the same as the first position of row 264. Video encoder 20 may also encode one or more syntax elements indicating that the next run of two consecutive entries in the scan direction in row 268 is the same as the first position of row 264.

In some examples, video encoder 20 may also determine whether to code the current pixel or index value relative to a position in another row (or column) or to code the current pixel or index value using a run syntax element. For example, after encoding the one or more syntax elements indicating the first position of row 264 and the run of two entries (noted above), video encoder 20 may encode, for the fourth and fifth positions in line 268 (from left to right), one or more syntax elements indicating a value of 2 for the fourth position and one or more syntax elements indicating a run of 1. Hence, video encoder 20 encodes these two positions without reference to another line (or column).

Video encoder 20 may then code the first position having an index value of 3 in row 268 relative to upper row 264 (e.g., indicating a copy from upper row 264 and the run of consecutive positions in the scan order having the same index value). Hence, according to aspects of this disclosure, video encoder 20 may select between coding pixel or index values of a line (or column) relative to other values of the line (or column), e.g., using a run, coding pixel or index values of a line (or column) relative to values of another line (or column), or a combination thereof. In some examples, video encoder 20 may perform a rate/distortion optimization to make the selection.

Video decoder 30 may receive the syntax elements described above and may reconstruct row 268. For example, video decoder 30 may obtain data indicating a particular location in a neighboring row from which to copy the associated index value for the position of map 240 currently being coded. Video decoder 30 may also obtain data indicating the number of consecutive positions in the scan order having the same index value.

In some instances, the line from which entries are copied may be directly adjacent to the entry of the line currently being coded (as illustrated in the examples of FIG. 3). However, in other examples, a number of lines may be buffered by video encoder 20 and/or video decoder 30, such that any of the number of lines of the map may be used as predictive entries for a line of the map currently being coded. Hence, in some examples, the pixel value for an entry may be signaled to be equal to a pixel value of an entry in a row immediately above (or column to the left of) or two or more rows above (or column to the left of) the current row.

In an example for purposes of illustration, video encoder 20 and/or video decoder 30 may be configured to store the previous n rows of entries prior to coding a current row of entries. In this example, video encoder 20 may indicate the predictive row (the row from which entries are copied) in a bitstream with a truncated unary code or other codes. In another example, video encoder 20 may encode (and video decoder 30 may decode) a displacement value between the current line and the predictive line of map 240 used as a reference for coding the current line. That is, video encoder 20 may encode an indication of a particular line (or column) from which an index value is copied. In some examples, the displacement value may be a displacement vector. That is, let $c[0], c[1], \ldots,$ denote the indices of the current line of map 240 and let $u[0], u[1], u[2], \ldots,$ denote the indices of a predictive line of map 240, such as an upper neighboring line. In this example, given a displacement vector is d, the index value for $c[i]$ may be predicted from $u[i+d]$, or $u[i-d]$ to avoid d taking negative values. The value of d may be coded using unary, truncated unary, exponential Golomb or Golomb-Rice codes.

As another example, video encoder 20 may signal an instruction, such as "copy from up line left half" or "copy from up line right half," indicating the neighboring line and the number or portion of entries of the neighboring line to copy to the line of the map currently being coded. As an additional example, the map of index values may be re-ordered before coding. For example, the map of index values may be rotated by 90, 180 or 270 degrees, or flipped upside down or left-side right to improve coding efficiency.

In other examples, video encoder 20 may not transmit runs of like-valued index values of map 240 to video decoder 30. In this case, video encoder 20 and/or video decoder 30 may implicitly derive the values of the runs. In one example, the value of a run may be a constant value, e.g., 4, 8, 16, or the like. In another example, the value of a run may be dependent on side information for the current block of video data being coded such as, for example, the block size, the quantization parameter (QP), the frame type, the color component, the color format (e.g., 4:4:4, 4:2:2, or 4:2:0), the color space (e.g., YUV or RGB), the scan direction and/or other types of characteristic information for the current block. In the case where the value of a run depends on the block size, the run may be equal to the width of the current block, the height of the current block, the half-width (or half-height) of the current block, a fraction of the width and/or the height of the current block, or a multiple of the width and/or the height of the current block. In another example, video encoder 20 may signal the value of a run to video decoder 30 using high level syntax, such as syntax information in a picture parameter set (PPS), a sequence parameter set (SPS), a video parameter set (VPS) and/or a slice header.

Additionally or alternatively, video encoder 20 may not even need to transmit map 240 to video decoder 30. Instead, video encoder 20 and/or video decoder 30 may implicitly derive a start position or location of each run of index values included in map 240. In one example, the video coding standard applied by video encoder 20 and/or video decoder 30 may determine that a run can only start at certain locations. For example, the run may only start at the beginning of each row, or the beginning of every N rows of a current block being coded. The start location may be different for different scan directions. For example, if the vertical scan is used, the run may only start at the beginning of a column or the beginning of every N columns of the current block.

In another example, the start location may be derived depending on side information for the current block such as, for example, the block size, the QP, the frame type, the color component, the color format (e.g., 4:4:4, 4:2:2, or 4:2:0), the color space (e.g., YUV or RGB), the scan direction and/or other types of characteristic information for the current block. In the case where the start location of a run depends on the block size, the start location may be the mid-point of each row and/or each column, or a fraction (e.g., $1/n$, $2/n, \ldots (n-1)/n$) of each row and/or column. In another example, video encoder 20 may signal the start position to video decoder 30 using high level syntax, such as syntax in a PPS, a SPS, a VPS and/or a slice header.

In some examples, the implicit start position derivation and the implicit run derivation, each described above, may be combined. For example, video encoder 20 and/or video decoder 30 may determine that a run of like-valued index values of the map is equal to a distance between two neighboring start positions. In the case where the start position is the beginning (i.e., the first position) of every row of a current block, then video encoder 20 and/or video decoder 30 may determine that the length of the run is equal to the length of an entire row of the current block.

Using the palette, a samples block can be mapped into an index block. Run-length based entropy coding is used to compress the index block. Per R. Joshi and J. Xu, "High efficient video coding (HEVC) screen content coding: Draft 2," JCTVC-S1005, Joint Collaborative Team on Video Coding (JCT-VC) of ITU-T SG 16 WP 3 and ISO/IEC JTC 1/SC 29/WG 11, 18th Meeting: Sapporo, J P, 30 Jun.-9 Jul. 2014 (hereinafter, "JCTVC-S1005"), palette mode was adopted into the HEVC Screen Content Coding standard for 4:4:4 chroma sub-sampling. This present disclosure describes new processes to extend palette mode into non-4:4:4 chroma sub-sampling scenarios. For example, related technologies can be applied to 4:2:2 chroma sub-sampling or 4:2:0 chroma sub-sampling.

Based on the characteristics of screen content video, palette coding was introduced to improve SCC efficiency. Specifically, palette coding introduces a lookup table, i.e., color palette, to compress repetitive pixel values based on the fact that in SCC, colors within one CU usually concentrate on a few peak values. Given a palette for a specific CU, pixels within the CU are mapped to the palette index. In the second stage, an effective copy from left run length method is proposed to effectively compress the index block's repetitive pattern. Later, the palette index coding mode was generalized to both copy from left and copy from above with run length coding. Although a transformation process could theoretically be implemented in conjunction with palette coding, in most implementations, no transformation process is invoked in order to avoid blurring sharp edges which can negatively impact the visual quality of screen content.

A palette is a data structure storing (index, pixel value) pairs. The designed palette may be decided by encoder 20 based on, for example, a histogram of pixel values in a current CU. For example, video encoder 20 may add peak values in the histogram to the palette, while not including low frequency pixel values in the palette. The size of a palette may be restricted to be in the range of 0 to max_palette_size equal to 31.

For SCC, CU blocks within one slice may share many dominant colors. Therefore, it may be possible to predict a current block's palette using palettes of previous palette mode CUs (in CU decoding order) as reference. For example, a 0-1 binary vector may be signaled to indicate whether the pixel values in the reference palette is reused by the current palette or not. As an example, in FIG. 4, it is assumed that a reference palette has 6 items. A vector (1, 0, 1, 1, 1, 1) is signaled with the current palette indicating $v_0$, $v_2$, $v_3$, $v_4$, and $v_5$ are re-used in the current palette while $v_1$ is not re-used. If the current palette contains colors not predictable from reference palette, the number of unpredicted colors is coded and then these colors are directly signaled. For example, in FIG. 4, $u_0$ and $u_1$ are directly signaled into the bitstream.

For the block coded with the palette mode, the palette can be predicted from the palette entries of the previously palette coded blocks, can be explicitly signaled as a new entries, or the palette of the previously coded block can be reused. A re-use vector may be signaled explicitly to the decoder.

In the current SCM4.0 test mode (i.e., Joshi et al., "HEVC Screen Content Coding Draft Text 3," Joint Collaborative Team on Video Coding (JCT-VC) of ITU-T SG 16 WP 3 and ISO/IEC JTC 1/SC 29/WG 11, 20$^{th}$ Meeting, Geneva, CH, 10 Feb.-17 Feb. 2015, document JCTVC-T1005, hereinafter, "JCTVC-T1005"), the two primary aspects of palette coding from a normative perspective are the coding of the palette and coding of the palette index for each sample in the block being coded in the palette mode. The coding of palette indices is performed using two primary modes, 'index' mode and 'copy above' mode. This is signaled by coding a palette_mode flag. The 'index' mode is also used to indicate escape samples, i.e., samples that do not belong to the palette. In the current design, a 'copy above' mode is not possible for the first row of the palette block. In addition, a 'copy above' mode may not follow another 'copy above' mode. In these cases, an 'index' mode is inferred.

Specifically, for palette mode, pixels in the CU are encoded in a horizontal/vertical snake scan order as follows:

For "Index" mode, one palette index is first signaled. If the index is equal to the size of the palette, this indicates that the sample is an escape sample. In this case, the sample value or quantized samples value for each component is signaled. For example, if the palette size is 4, for non-escape samples, the palette indices are in the range [0, 3]. In this case, an index value of 4 signifies an escape sample. If the index indicates a non-escape sample, run-length is signaled, which specifies the number of subsequent samples in scanning order that share the same index, by a non-negative value n−1 indicating the run length, which means that the following n pixels including the current one have the same pixel index as the first signaled one.

For "Copy from Above" run mode (CA), only a non-negative run length value m−1 is transmitted to indicate that for the following m pixels including the current one, palette indexes are the same as their neighbors directly above, respectively. Note that this mode is different from "Index" mode, in the sense that the palette indices could be different within the Copy from Above run mode.

In a current design, the palette mode is signaled at a CU level, but the palette mode may be possible to signal it at a PU level. A flag, palette_esc_val_present_flag, is also signaled to indicate the presence of escape samples in a current block.

In the palette mode, the pixel scanning in the block can be of two types: vertical traverse or horizontal traverse (snake like) scanning. The scanning pattern used in the block is derived according to the flag, palette_transpose_flag, signaled per block unit.

During palette index coding, a palette index adjustment process can be applied. Starting from the second pixel in the block, the palette index adjustment process may comprise or consist of checking the palette mode of the previously coded pixel. First, the palette size is reduced by 1, and if the left mode is equal to the Index mode, then the palette index to be coded is reduced by 1. If the index is greater than the left palette index or if the left mode is Copy from Above mode, then the palette index to be coded is reduced by 1 if the index is greater than the above palette index. The description is provided from the encoding side, and the corresponding process can be performed in the reverse order at decoder side as well.

In the current SCM4.0 test mode, the palette index is coded using truncated binary code. Truncated binary coding is typically used for uniform probability distributions with a finite alphabet, although not used in the current HEVC. Truncated binary coding is parameterized by an alphabet with total size of number n. Truncated binary coding is a slightly more general form of binary encoding when n is not a power of two.

If n is a power of 2, then the coded value for $0 \leq x < n$ is the simple binary code for x of length log 2(n). Otherwise, let k=floor(log 2(n)) such that $2k \leq n < 2k+1$ and let u=2k+1−n.

Truncated binary coding assigns the first u symbols codewords of length k and then assigns the remaining n-u symbols the last n-u codewords of length k+1. Table 1 is an example for n=5.

TABLE 1

| Truncated binary codeword binarization | | |
|---|---|---|
| Symbol | Bin string | |
| 0 | 0 | 0 |
| 1 | 0 | 1 |

TABLE 1-continued

Truncated binary codeword binarization

| Symbol | Bin string | | |
|---|---|---|---|
| 2 | 1 | 0 | |
| 3 | 1 | 1 | 0 |
| 4 | 1 | 1 | 1 |
| binIdx | 0 | 1 | 2 |

In the current SCM4.0 index coding, all bins in the truncated binary code re bypass coded. The dynamic range of the truncated binary code is a reduced index dynamic range after index adjustment process mentioned above.

In the current SCM4.0, the binarization of run value is a concatenation of unary code and exponential Golomb code of order 0 (switching point at 1) as shown in Table 2.

TABLE 2

Concatenation of unary code and exponential Golomb code of order 0

| Symbol | Prefix | Suffix | Run length |
|---|---|---|---|
| 0 | 1 | | 1 |
| 1 | 01 | | 2 |
| [2, 3] | 001 | X | 4 |
| [4, 7] | 0001 | XX | 6 |
| . . . | | | |

Up to first five bins in the prefix are using regular bin and the remaining prefix (if any) and suffix are using bypass bin. For the first bin, the context assignment depends on the palette run mode and palette run index value (if the palette run mode is index mode).

To increase the throughput of entropy coding, grouping of bypass bins is desirable. One possible solution would be grouping the index coding at the front (before run coding) as described in Karczewicz et al., "Non CE1: Grouping Palette Indices At Front," in Joint Collaborative Team on Video Coding (JCT-VC) of ITU-T SG 16 WP 3 and ISO/IEC JTC 1/SC 29/WG 11 20th Meeting, JCTVC-T0065, Geneva, CH, 10-18 Feb. 2015 (hereinafter, "JCTVC-T0065"). Another possible solution is to group the index at the end (after run coding). In this case, the dependency problem between index and run has to be solved. The following is a proposed solution.

In accordance with one or more techniques of this disclosure, all of the palette indexes are grouped at the end (e.g. after run values). Therefore, coding of a run value does not depend on an index value. Instead, the run context is proposed to be dependent on the pixel position within the current block, or the (adjusted) palette size for the current block, or a combination of both.

To improve the coding performance of index coding, a novel binarization method is proposed which depends on palette size (or adjusted palette size) and run value.

To increase the entropy coding throughput, this disclosure proposes grouping the index coding (e.g. the index-related syntax elements) together after run coding (e.g. after run-related syntax element). An example of a syntax structure implementing such a technique is shown below in Table 3.

TABLE 3

Grouping the index at the end

```
while (PaletteScanPos < nCbS*nCbs)
{
    palette_run_type_flag[xC][yC]
```

TABLE 3-continued

Grouping the index at the end

```
    palette_run_msb_id_plus1
    if(palette_run_msb_id_plus1 > 1)
        palette_run_refinement_bits
    PaletteScanPos += paletteRun
}
PaletteScanPos = 0;
while(PaletteScanPos < nCbS*nCbs)
{
    if (palette_run_type_flag[xC][yC] == 0) //index mode
        palette_index_idc
    PaletteScanPos += paletteRun
}
```

In some examples, the syntax shown in Table 3 is in a palette_coding syntax structure. The palette_coding syntax structure is included in a coding_unit syntax structure for a CU.

In Table 3, The syntax element palette_run_type_flag[xC][yC] equal to COPY_ABOVE_MODE specifies that the palette index is equal to the palette index at the same location in the row above. palette_run_type_flag[xC][yC] equal to COPY_INDEX_MODE specifies that an indication of the palette index of the sample is coded in the bitstream. The array indices xC, yC specify the location (xC, yC) of the sample relative to the top-left luma sample of the picture. When palette_run_type_flag is not present, palette_run_type_flag is inferred as follows: If CurrNumIndices is equal to NumPaletteIndices and MaxPaletteIndex is greater than 0, palette_run_type_flag is inferred to be equal to COPY_ABOVE_MODE. Otherwise (CurrNumIndices is less than NumPaletteIndices or MaxPaletteIndex is equal to 0), palette_run_type_flag is inferred to be equal to COPY_INDEX_MODE The syntax element palette_run_msb_id_plus1 minus 1 specifies the index of the most significant bit in the binary representation of paletteRun. The value of palette_run_msb_id_plus1 shall be in the range of 0 to Floor(Log 2((MaxPaletteRun))+1, inclusive.

The syntax element palette_run_refinement_bits specifies the refinement bits in the binary representation of paletteRun. The variable paletteRun specifies the number of consecutive locations minus 1 with the same palette index as the position in the above row when palette_run_type_flag is equal to COPY_ABOVE_MODE or specifies the number of consecutive locations minus 1 with the same palette index when palette_run_type_flag is equal to COPY_INDEX_MODE. When palette_run_refinement_bits is not present, palette_run_refinement_bits is inferred to be equal to 0. When palette_run_msb_id_plus1 is present, the variable paletteRun is derived as follows:

If palette_run_msb_id_plus1 is greater than 1, paletteRun=(1<<(palette_run_msb_id_plus1−1))+palette_run_refinement_bits Otherwise (palette_run_msb_id_plus1 equal to 0 or 1), paletteRun is set equal to palette_run_msb_id_plus1.

The syntax element palette_index_idc is an indication of an index to the array represented by currentPaletteEntries. The value of palette_index_idc shall be in the range of 0 to MaxPaletteIndex, inclusive, for the first index in the block and in the range of 0 to (MaxPaletteIndex−1), inclusive for the remaining indices in the block. When palette_index_idc is not present, it is inferred to be equal to 0.

When run is coded first, the run context assignment cannot depend on the index value since the index value information is not available at this stage. To solve this dependency issue and maintain a good coding performance of the run coding, different context assignment methods are proposed in the following.

Hence, in accordance with an example of this disclosure, video decoder 30 may determine, based on first entropy encoded data in a bitstream, a set of run-related syntax element groups for a current block of a current picture of the video data (e.g., a palette_run_type_flag syntax element, a palette_run_msb_id_plus1 syntax element, and optionally a palette_run_refinement_bits syntax element). Furthermore, video decoder 30 may determine, based on second entropy encoded data in the bitstream, a set of palette index syntax elements (e.g., palette_index_idc) for the current block, the set of palette index syntax elements occurring in the bitstream after the set of run-related syntax element groups. In this example, each respective run-related syntax element group of the set of run-related syntax element groups indicates a respective type of a respective run of identical palette mode type indicators and a respective length of the respective run. In this example, each respective palette index syntax element of the set of palette index syntax elements indicates an entry in a palette comprising a set of sample values. Video decoder 30 may reconstruct, based on the sample values in the palette, the current block.

Similarly, in one example, video encoder 20 may include, in a bitstream, first entropy encoded data corresponding to a set of run-related syntax element groups for a current block of a current picture of the video data (e.g., a palette_run_type_flag syntax element, a palette_run_msb_id_plus1 syntax element, and optionally a palette_run_refinement_bits syntax element). Video encoder 20 may include, in the bitstream, second entropy encoded data corresponding to a set of palette index syntax elements (e.g., palette_index_idc) for the current block. In this example, the first entropy encoded data occurs in the bitstream before the second entropy encoded data. In this example, each respective run-related syntax element group of the set of run-related syntax element groups indicates a respective type of a respective run of identical palette mode type indicators and a respective length of the respective run. In this example, each respective palette index syntax element of the set of palette index syntax elements indicates an entry in a palette comprising a set of sample values.

This disclosure proposes using run context assignment instead of depending on an index value. This disclosure proposes using the starting pixel location for the current run to assign the context for run coding. As an example, if the starting pixel is the first pixel in the current block, a context A is used to code the first bin of run; otherwise, if the starting pixel is the in the first row, a context B is used to code the first bin of run; otherwise, a context C is used to code the first bin of run. Note that in this case, the contexts for "index" and "copy above" modes may or may not be the same. In other words, for each palette_run_type_flag, a set of position dependent context assignment can be used. The contexts for these two modes may or may not be shared. Also, note that the position dependent context assignment is not restricted to the first bin only, and can be applied to other regular bins as well.

For example, for each respective run-related syntax element group of the set of run-related syntax element groups, a video coder (e.g., video encoder 20 or video decoder 30) may select, from a plurality of entropy coding contexts, a respective entropy coding context for the respective run-related syntax element group. In this example, the selection of the respective entropy coding context is not dependent on any of the palette index syntax elements. The video coder may entropy code, based on the selected entropy coding context, a bin of the respective run-related syntax element group. In this example, the video coder may select, based on a position within the current block of a starting pixel of a respective run corresponding to the respective run-related syntax element group, the respective entropy coding context for the respective run-related syntax element group.

Alternatively, this disclosure proposes using the palette size of the current block to assign the context for the first bin (or other regular bin) of run coding. As an example, if the current palette size is smaller than a threshold $T_1$, context A is used to code the first bin; otherwise, if the palette size is smaller than $T_2$, context B is used to code the first bin; otherwise, context C is used to code the first bin. Similar to the techniques described above with respect to run context assignment depending on a starting pixel location, the context assignment can be generalized to both "index" and "copy above" modes, or multiple regular bins, or combinations of these.

For example, a video coder may select, based on a size of the palette, the respective entropy coding context for the respective run-related syntax element group.

A novel binarization method is proposed to code the index value to efficiently exploit the relationship between (adjusted) palette size and run value information. Note that in this section, the proposed methods are explained as an example based on adjusted palette size after index adjustment as mentioned elsewhere in this disclosure. The proposed methods can be applied to original palette size as well. For easy explanation, the adjusted palette size is used in the following.

Depending on different run values, different index binarization methods are proposed. As an example, if the run value is $R_1$, a binarization method $B_1$ is used; otherwise, a binarization method $B_2$ is used as shown in Table 4, where $R_1$ is equal to 0 in this example. $B_1$ and $B_2$ could be any binarization methods that can represent the value in the range of [0, adjustedPaletteSize−1] inclusively. As an example, $B_1$ or $B_2$ can be a truncated binary codeword or unary code, or Golomb family code (exponential Golomb code, Golomb rice code, concatenation of these, or truncated version of these), or combination of these, or flag plus any of these binarization codewords.

As an alternative example, more than two binarization methods may be used depending on the run value.

TABLE 4

| Pseudo code for index binarization depending on run value |
|---|
| palette_index_idc( ) <br> { <br>   if (paletteRun == 0) <br>   { <br>     Binarization Method $B_1$ <br>   } <br>   Else <br>   { <br>     Binarization Method $B_2$ <br>   } <br> } |

For example, for each respective palette index syntax element of the set of palette index syntax elements, video decoder 30 may obtain, from the bitstream, data corresponding to a respective palette index syntax element.

In this example, video decoder 30 may entropy decode the data corresponding to the respective palette index syntax element to determine a binarized version of the respective palette index syntax element. Furthermore, video decoder 30 may determine, based on a number of consecutive locations with the same palette index, a binarization method. Video decoder 30 may determine the respective palette index syntax element using the determined binarization method to debinarize the binarized version of the respective palette index syntax element.

In another example, for each respective palette index syntax element of the set of palette index syntax element elements, video encoder 20 may determine, based on a number of consecutive locations with the same palette index, a binarization method. Video encoder 20 may generate a binarized version of the respective palette index syntax element using the determined binarization method. Furthermore, in this example, video encoder 20 may entropy encode the binarized version of the respective index syntax element. Video encoder 20 may include, in the bitstream, the entropy encoded binarized version of the respective palette index syntax element.

Depending on different adjusted palette size (adjustedPaletteSize), different index binarization methods are proposed. As an example, if the adjustedPaletteSize is smaller than $S_1$, a binarization method $B_1$ is used; otherwise, a binarization method $B_2$ is used. $S_1$ can be any valid integer numbers in the range of [0, maxPaletteSize] inclusively. The threshold $S_1$ could be a predefined value at both encoder and decoder, or explicitly coded in slice, picture or sequence level, or coded using relative difference between 0 or maxPaletteSize. As an example, $S_1$ is equal to 5 shown in Table 5. Similar to the section of this disclosure entitled "Index coding using run value information," $B_1$ or $B_2$ can be a truncated binary codeword or unary code, or Golomb family code (exponential Golomb code, Golomb rice code, concatenation of these, or truncated version of these), or combination of these, or flag plus any of these binarization codewords, with $B_1$ and $B_2$ potentially being different. Here, different binarization methods ($B_1$ or $B_2$) are used to code different index dynamic ranges. For instance, in Table 5, below, $B_1$ is used to code index dynamic range of [0, 4] inclusively; while $B_2$ is used to code index dynamic range of [5, adjustedPaletteSize−1] inclusively.

As an alternative example, more than two binarization methods may be used depending on (adjusted) palette size.

TABLE 5

Pseudo code for index binarization depending on (adjusted) palette size

```
palette_index_idc( )
{
    if (adjustedPaletteSize < 5)
    {
        Binarization Method B₁
    }
    Else
    {
        Binarization Method B₂
    }
}
```

For example, for each respective palette index syntax element of the set of palette index syntax element elements, video decoder 30 may obtain, from the bitstream, data corresponding to a respective palette index syntax element. In this example, video decoder 30 may entropy decode the data corresponding to the respective palette index syntax element to determine a binarized version of the respective palette index syntax element. Furthermore, video decoder 30 may determine, based on a palette size, a binarization method. Video decoder 30 may determine the respective palette index syntax element using the determined binarization method to debinarize the binarized version of the respective palette index syntax element.

In another example, for each respective palette index syntax element of the set of palette index syntax element elements, video encoder 20 may determine, based on a palette size, a binarization method by, for example, selecting one of a plurality of different binarization methods. Video encoder 20 may generate a binarized version of the respective palette index syntax element using the determined binarization method. Furthermore, in this example, video encoder 20 may entropy encode the binarized version of the respective index syntax element. Video encoder 20 may include, in the bitstream, the entropy encoded binarized version of the respective palette index syntax element.

This disclosure proposes coding index using both run and (adjusted) palette size information jointly with the methods in the sections of this disclosure entitled "Index coding using run value information" and "Index coding using (adjusted) palette size information." For each binarization method, index value reordering can be applied to improve the coding efficiency. For instance, in Table 6, symbol "0" is using codeword "111" instead of "00" by shifting all the symbols and putting symbol "0" at the end.

TABLE 6

Reordering of truncated binary codeword

| Symbol | Bin string | | |
|--------|---|---|---|
| 1 | 0 | 0 | |
| 2 | 0 | 1 | |
| 3 | 1 | 0 | |
| 4 | 1 | 1 | 0 |
| 0 | 1 | 1 | 1 |
| binIdx | 0 | 1 | 2 |

As an example of using both palette size and run information, the following is a binarization method for index coding.

TABLE 7

A decoder example of index coding using both palette size and run information

```
palette_index_idc( )
{
    if (adjustedPaletteSize >1){
        if (paletteRun == 0){
            readTruncatedBinaryCode(uiSymbol,
adjustedPaletteSize)
            if (adjustedPaletteSize < 16){
                uiSymbol = uiSymbol ==
                (adjustedPaletteSize−1)?
0: (uiSymbol + 1)
            }
        }
        else if (adjustedPaletteSize < 5){
            index_zero_flag
            if(index_zero_flag == 0){
                uiSymbol = 0
            }else{
                readTruncatedBinaryCode(uiSymbol,
adjustedPaletteSize−1)
                uiSymbol++
```

TABLE 7-continued

A decoder example of index coding using
both palette size and run information

```
        }
    }else{
        if (paletteRun < 3){
            smaller_than_two_flag
            if (smaller_than_two_flag == 0){
                index_zero_flag
                uiSymbol = index_zero_flag ? 1 : 0
            }else{
                readTruncatedBinaryCode(uiSymbol,
adjustedPaletteSize-2)
                uiSymbol += 2
            }
        else{
            index_zero_flag
            if (index_zero_flag == 0){
                uiSymbol = 0
            }else{
                smaller_than_three_flag
                if (smaller_than_three_flag == 0){
                    index_one_flag
                    uiSymbol = index_one_flag ? 2 : 1
                }else{
    readTruncatedBinaryCode(uiSymbol, adjustedPaletteSize-3)
                    uiSymbol += 3
                }
            }
        }
    }
    else{
        uiSymbol = 0
    }
}
```

In some examples, these palette index predictor techniques may be combined with techniques described in more detail below, where two (or more) previous coded palette indices are used to predict the current index. The predictor mechanism can be dependent on palette size and/or run length.

Explicit signaling of the variable length code to be used may also be implemented. In such an example, multiple variable length codes may be used to code the index values. For each palette block, the type of variable length code to be used is explicitly signaled. As one example, the choice may be between a truncated binary code and an exponential Golomb type of code. If the variable length code is parameterized, the specific parameter to be used may be signaled. For example, when an exponential Golomb type of code is signaled, the parameter for the exponential Golomb may be signaled.

In an alternative embodiment, the type of variable length code signaled may be used only for runs greater than or equal to a RUN_THRESHOLD. In a preferred embodiment, the RUN_THRESHOLD is 1. The signaling of type of variable length code may be conditional on the number or percentage of runs greater than or equal to RUN_THRESHOLD exceeding a MAG_THRESHOLD. If the type of variable length code is not signaled, a default one may be used. An example of a default variable length code would be truncated binary code.

The RUN_THRESHOLD and MAG_THRESHOLD may be known to both the encoder and the decoder or it may be sent in the bitstream, for example in the VPS, SPS, PPS, slice header, etc.

The techniques of this disclosure also include adaptively choosing the variable length code for index coding. In such an example, multiple variable length codes may be used to code the index values. But instead of explicitly signaling the variable length code to use or having a fixed rule based on run value and adjustedPaletteSize, the choice of the variable length code is adaptive based on index statistics. As an example, for each index value that is coded, a counter is maintained. If the value exceeds a specific threshold, the counter is incremented by 1; otherwise, it is decremented by 1. The threshold may be fixed throughout the video sequence or may depend on adjustedPaletteSize. The value of the counter may determine the variable length code that is used to code the index value. For example, the type of VLC codes may be truncated binary code with truncation value of adjustedPaletteSize, an exponential Golomb code or other codes described above.

The threshold may be known to both the encoder and the decoder or it may be sent in the bitstream, for example in the VPS, SPS, PPS, slice header, etc.

In one example of the techniques described above, for each respective palette index syntax element of the set of palette index syntax element elements, video decoder 30 may obtain, from the bitstream, data corresponding to a respective palette index syntax element. In this example, video decoder 30 may entropy decode the data corresponding to the respective palette index syntax element to determine a binarized version of the respective palette index syntax element. Furthermore, video decoder 30 may determine, based on a palette size and a number of consecutive locations with the same palette index, a binarization method. Video decoder 30 may determine the respective palette index syntax element using the determined binarization method to debinarize the binarized version of the respective palette index syntax element.

In another example, for each respective palette index syntax element of the set of palette index syntax element elements, video encoder 20 may determine, based on a palette size and a number of consecutive locations with the same palette index, a binarization method. Video encoder 20 may generate a binarized version of the respective palette index syntax element using the determined binarization method. Furthermore, in this example, video encoder 20 may entropy encode the binarized version of the respective palette index syntax element. Video encoder 20 may include, in the bitstream, the entropy encoded binarized version of the respective palette index syntax element.

Examples are described herein for grouping indices after signaling some or all of the occurrences of the palette run type and palette run length syntax elements, instead of grouping indices at the front of the block. In such examples, the CABAC contexts of a palette run length syntax element cannot depend on corresponding indices, as the decoder decodes run length before decoding the indices. Further examples are described herein for coding the indices depending on a corresponding run length of the indices.

In some examples, when an INDEX_COPY run length is known before decoding a corresponding index, such run length information may be used to decode the index. For example, palette indices for a block may include {0, 1, 2, 3, 4, 5}, including index 0, index 1, index 2, index 3, index 4, and index 5. In one example of using run length information, if the run length is greater than a threshold, such as a threshold T, one set of codewords may be used to decode the index. In another example, if the run length is less than or equal to the threshold T, another set of codewords may be used. In one example, T may be equal to 0. In such an example, when the run length is greater than 0, one set of codewords may be used. When the run length is equal to 0, another set of codewords may be used.

In some examples, when the run length is greater than T, a list of index predictors (or an index predictor list) may be used to code the current index. In some cases, there may be a maximum size restriction on the list. In one example, a maximum list size of 2 is used to describe some examples described herein. However, the examples described herein are not limited to this example, and any other predictor list size restriction may be used.

In some examples, an index predictor list may be constructed using previously decoded indices. Before decoding indices in a block, an index predictor list may be initialized to empty, or may be initialized with some predefined indices. In one example, the index predictor list may be initialized with a single element equal to {0} or {0, 1}. In some examples, one or more pruning methods may be applied (individually or in any combination) to the predictor list. For example:
1. A decoded index may be added into the index predictor list only if the decoded index is different from any existing element in the list;
2. A decoded index may be added into the index predictor list only if a corresponding run length of the decoded index is greater than a threshold $T_1$. In one example, $T_1$ is equal to 0. In such an example, a decoded index may be added into the list only if its corresponding run length is greater than 0;
3. In one example, the value added into the index predictor list may be decoded index values. In another embodiment, the value added into the index predictor list may be the parsed value before decoding. As used herein, the term parsed value is used to refer to the output value of an entropy decoder, before making an adjustment based on its neighboring index values.

In some examples, the palette index prediction method discussed herein may only be applied when the palette size or the maximal feasible index value is greater than a threshold. In one example, a value for the threshold may be chosen to be 4.

At a decoder, a flag may be decoded to indicate whether the corresponding index is predicted from the index predictor list or not, if the list is not empty. In one example, a value of 1 for the flag is used to indicate that an index is predicted from the index predictor list. In another example, a value of 0 for the flag is used to indicate that an index is predicted from the index predictor list. If the current index is predicted from the list, a value I is decoded to specify which entry in the list is used. If the list size is equal to 1, value I may be bypassed as there is only one candidate in the list. If the list size is greater than 1, a code may be used to code I. Examples of codes may include a Golomb-Rice code, a Exp-Golomb code, a Unary code, truncated versions of these codes, or other suitable codes. For example, if the list size is 2, a flag may be used to specify which entry in the list is chosen for use. The selected entry value in the list may either be treated as decoded index or parsed index. If the selected entry value is treated as the decoded index, then after getting the value, the decoder may not need to perform an index adjustment operation based on a neighboring index. Alternatively, if the selected entry value is treated as the parsed index, after getting the value, the decoder may need to perform the index adjustment operation based on its neighboring index.

In some examples, if the flag indicates that the index is predictable from the index predictor list, the decoder may assume that the number of active candidates (or entries) in the predictor list is a constant or threshold T. For example, the decoder may assume that the number of active candidates in the predictor list is 2. If the actual number of candidates is greater than T, only T of them may actually be used. For example, if T=2, only the first two entries, the last two entries, or two entries selected according to certain rule, may be used. If the number of actual entries in the list is less than T, redundant signaling may be used to simplify implementation. For example, if T=2, and the candidate has only one element, then one redundant bin may still be signaled to indicate that the first element (out of one in total) in the list is used.

In some examples, alternative signaling of a used entry in the index predictor list may be used instead of signaling a flag first to indicate whether an index is predictable or not from the index predictor list and then signaling the predicted entry index. For example, separate codewords may be reserved for the selected predicted entry. For example, if T=2, the first predictor entry may be allocated with a codeword '0', the second predictor entry may be allocated with a codeword '10', and the non-predicted entries are prefixed with '11'.

In some examples, a pruning procedure may be applied to reduce the candidate number in the palette index predictor list. For example, if the previous pixel in scanning order has a palette run type of INDEX_COPY, then the current index cannot be the same as the index of the previous pixel. In this example, the index of the previous pixel may be removed from the index predictor list, or may be kept in the index predictor list but marked as invalid for the current index prediction. Alternatively, if the previous pixel in scanning order has a palette run type of COPY_ABOVE, then the current index cannot be the same as the index of the above neighbor of the previous pixel. In this example, the above neighbor's index may be removed from the predictor list, or may be kept in the list but marked as invalid for the current index prediction.

If the flag described above indicates that the current index is not predictable from the index predictor list, then the index can be decoded from the bitstream. A code may be used to code the index. Examples of codes may include a Golomb-Rice code, a Exp-Golomb code, a Unary code, truncated versions of these codes, or other suitable codes. In some examples, an adjustment process may be used for the index value I, as well as the maximal feasible index values M (value M may be used if a truncated version of the codeword is used). In some examples, an extended list may indicate the index predictor list if a neighboring based adjustment is not applicable. In some examples, an extended list indicates the index predictor list by merging the index predictor list and the reference neighboring index if the neighboring based adjustment is applicable. If there are duplicated entries in the extended list, only one of the duplicated entries is kept. The maximal feasible index values M may be reduced by the extended list size. At the encoder side, to code the index value I, it may be reduced by the number entries in the extended list whose values are smaller than I.

In some examples, the dynamic range reduction procedure may be slacked to simplify implementation. In one example, M may be subtracted by the size of index predictor list, instead of the size of the extended predictor list. In this case, if the size of the predictor list is a constant (e.g., constant T described above), then the maximal feasible index may be predetermined before parsing.

In one example of implementing techniques described above, video encoder 20 generates a palette for an encoded block of video data. The palette includes one or more palette entries. A palette entry indicates a pixel value for a pixel of a block of video data represented by the encoded block of video data. Video encoder 20 determines one or more index values for the one or more palette entries and transmits signaling information for the encoded block of video data. The signaling information includes, for example, a palette run type, a palette run length, and the one or more index values. The palette run type and the palette run length may be signaled before the one or more index values. The signaling information may further include a flag indicating whether an index value is predictable using a list of index predictors. Video encoder 20 may determine the one or more index values using Golomb-Rice coding, Exp-Golomb coding, unary coding, truncated Golomb-Rice coding, truncated Exp-Golomb coding, or truncated unary coding.

In another example of implementing techniques described above, video decoder 30 receives an encoded block of video data and obtains a palette for the encoded block of video data. The palette includes one or more palette entries that indicate a pixel value for a pixel of a block of video data represented by the encoded block of video data. Video decoder 30 obtains signaling information for the encoded block of video data. The signaling information includes a palette run type and a palette run length. Video decoder 30 determines an index value based on the palette run length.

In one example, video decoder 30 determines a list of index predictors to use for determining the index value. The list of index predictors includes one or more index values, and the list of index predictors can be used for determining the index value when the palette run length is greater than a threshold value. Video decoder 30 determines the index value using the list of index predictors. The threshold value may, for example, be equal to 0. Video decoder 30 may construct the list of index predictors using one or more previously decoded index values.

To construct the list of index predictors using the one or more previously decoded index values, video decoder 30 may, for example, determine that a decoded index value is different from any of one or more elements included in the list of index predictors and add the decoded index value to the list of index predictors. The one or more elements may include at least one previously decoded index value. To construct the list of index predictors using the one or more previously decoded index values includes, video decoder 30 may additionally or alternatively determine that a run length of a decoded index is greater than the threshold value and add the decoded index to the list of index predictors. The one or more index values in the list of index predictors may include a decoded index value or a parsed index value.

In some examples, the signaling information may include a flag indicating whether the index value is predictable using a list of index predictors, and video decoder 30 may determine a value of the flag and determine, based on the value of the flag, that the index value is predictable using a list of index predictors. Video decoder 30 may decode an entry value indicating an entry from the list of index predictors to use for determining the index value.

In some examples, a normative restriction is imposed to an encoder that the palette indices belonging to region II appear sequentially in scanning order. For example, assume that region I contains palette indices {0, 1, 2} and region II contains palette indices {3, 4, 5}, with each value in an indices being an index. Regardless of the indices {0, 1, 2}, the normative restriction indicates the first occurrence of index 3 must be in front of {4, 5}, and the first occurrence of index 4 must be in front of 5.

In this paragraph, it is assumed that there is no escape pixel in the block. When coding the palette index using truncated binary code, two input parameters are used. The first input parameter is the index value itself, and the other input parameter is the maximal feasible index value. Using the example region I ({0, 1, 2}) and region II indices ({3, 4, 5}) presented above, such maximal feasible index value may be 5. In such an example, the cost of coding each index using truncated binary code is between 2 bits and 3 bits. In some examples, if the normative bitstream restriction described above is imposed, then at the beginning of the block, when the decoder starts decoding an index, instead of choosing the maximal feasible index value equal to 5, the decoder may choose the maximal value to be equal to the number of element in the region I indices. In such examples, the maximal feasible value may be 3. After decoding an index, if the index equals to maximal feasible value, then the maximal feasible value is increased by one unless it hits the palette size minus 1 (in the example, the maximal feasible value stops increasing when it hits 5 due to the palette size being equal to 6). If the decoded index is not equal to maximal feasible value, the maximal feasible value is kept unchanged.

In examples in which one or more escape pixels exist in the current block, an escape pixel is marked using a reserved index equal to palette size in the current draft specification. In some examples, an escape pixel may include a pixel of a block that is not included in the palette for the block. In the example described above, an index 6 is used to represent the escape pixel. So, in the example, region I={0, 1, 2}, region II={3, 4, 5}, escape={6}.

In some examples, when using the normative restriction described above, the escape pixel may be marked using a reserved value equal to the size of region I. Using the example region I ({0, 1, 2}) and region II indices ({3, 4, 5}) presented above, an escape pixel is marked using index 3. With this change, indices in region II are increased by one. For example, region II includes index {4, 5, 6}. Specifically, region I={0, 1, 2}, region II={4, 5, 6}, escape={3}. In this case, when the decoder starts decoding a block, the maximal feasible index may be initialized to the size of region I plus one. In the example, the initial maximal feasible index may be chosen to be 4 (due to the size of region I being equal to 3). After decoding an index, if the index equals to maximal feasible value, then the maximal feasible value is increased by one unless it hits the palette size (in the example, the maximal feasible value stops increasing when it hits 6). If the decoded index is not equal to the maximal feasible value, the maximal feasible value is kept unchanged.

In some examples, truncated code other than truncated binary code may be used to code the indices as well, such as truncated unary code, truncated Exp-Golomb code, or truncated Golomb-Rice code, or a combination thereof.

In some instances of a palette mode, a palette run type (e.g., a palette run type flag or palette run mode flag) specifying whether a palette run is a copy above run (or mode) or an index copy run (or mode) may be signaled first, followed by an index value if the type is an index copy mode or run. In such instances, the overall bits in the bitstream may be:

For copy above mode: '1'
For copy left mode: '0'+Index

The index may be selected from 0 until a threshold $\underline{T}$ inclusively. In one example, $\underline{T}$ may be selected to be equal to palette size minus 1 (palette size−1) if there is no escape pixel. In another example, $\underline{T}$ may be selected to be equal to palette size if there may exist an escape pixel. Examples are described herein for using one or more unified codewords to represent these two examples. In some examples, the copy above mode may be allocated a reserved index equal to T+1.

In some examples, at the decoder side, there may be no palette run mode flag or type flag. For example, a decoder may decode an index codeword first. If the decoded index codeword equals to the reserved index (e.g., T+1), then the current run is determined to be a copy above run (or mode). If the decoded index codeword does not equal to the reserved index (e.g., T+1), the current run is determined to be an index copy run (or mode).

In some examples, the index codeword reserved for copy above run mode may be one or more predetermined values known or inferred by both the encoder and decoder. In some examples, the index codeword reserved for copy above run mode may be adaptively selected based on block size, palette size, presence of escape pixels, number of indices in the block, quantization steps, etc.

In some examples, to code the unified index (e.g., the one or more unified codewords), Unary code, Golomb code, binary code, truncated versions of these codes, a combination thereof, or other suitable codes may be used.

In one example of implementing techniques described above, video encoder 20 generates a palette for a block of video data. The palette includes one or more palette entries, and a palette entry indicates a pixel value for a pixel of the block of video data. Video encoder 20 determines one or more index values for the one or more palette entries. At least one index value of the one or more index values belongs to a first region of the palette and at least one other index value of the one or more index values belonging to a second region of the palette. Video encoder 20 assigns, according to a restriction, index values to the second region of the palette in a sequential scanning order, the restriction indicating that the index values are to appear in the second region in the sequential scanning order. The restriction may, for example, indicate that a first occurrence of an index value is to appear in the second region in the sequential scanning order.

In some examples, the block of video data does not include an escape pixel, while in other examples, the block of video data may include one or more escape pixels. Video encoder 20 may determine the one or more index values using truncated binary coding, truncated unary coding, truncated Exp-Golomb coding, or truncated Golomb-Rice coding.

In another example of implementing techniques described above, video decoder 30 receives an encoded video block and obtains a palette for the encoded video block. The palette includes one or more palette entries, with a palette entry indicating a pixel value for a pixel of a block of video data represented by the encoded video block. Video decoder 30 decodes one or more index values for the one or more palette entries. At least one index value of the one or more index values belongs to a first region of the palette, and at least one other index value of the one or more index values belongs to a second region of the palette. Index values of the second region are coded in a sequential scanning order according to a restriction that indicates that the index values are to appear in the second region in the sequential scanning order. Video decoder 30 determines pixel values for pixels of the block of video data using the palette and the one or more index values. The restriction may, for example, indicate that a first occurrence of an index value is to appear in the second region in the sequential scanning order. Video decoder 30 may decode the one or more index values using truncated binary coding, truncated unary coding, truncated Exp-Golomb coding, or truncated Golomb-Rice coding.

In some examples, the block of video data does not include an escape pixel. Video decoder 30 may also select a maximal feasible index value to be a number of index values in the first region. Video decoder 30 may decode an index value and determine that the decoded index value is equal to the maximal feasible value. Video decoder 30 may increase the maximal feasible index value by one when the decoded index value is equal to the maximal feasible value. In some examples, video decoder 30 may not increase the maximal feasible index value when the decoded index value is equal to the number of index values in the palette minus one.

In some example, the block of video data includes one or more escape pixels. The escape pixel may be indexed using a reserved value equal to a number of index values in the first region. Video decoder 30 may select a maximal feasible index value to be the number of index values in the first region plus one. Video decoder 30 may decode an index value and determine that the decoded index value is equal to the maximal feasible value. Video decoder 30 may increase the maximal feasible index value by one when the decoded index value is equal to the maximal feasible value. In some examples, the maximal feasible index value is not increased when the decoded index value is equal to the number of index values in the palette.

In the current SCC text specification and test model, if a block is coded using palette mode, the palette indices for the samples in the block are coded using run coding. A truncated version of concatenation of unary code and exponential Golomb code of order 0 is used to code the individual runs. An example of the code used for a truncation value (maximum value) of 6 is shown below in Table 8. Table 8 also shows the corresponding non-truncated code. Note that for run values 4, 5 and 6, both prefix and suffix are truncated. For prefix, a truncated unary code is used. Hence, for run values 4, 5 and 6, instead of using 0001 as prefix, it is sufficient to use the prefix 000. For suffix, a truncated binary code is used. This results in a one-bit prefix for run value of 4 and two bit prefixes for run values of 5 and 6. Also note that instead of using prefix of the type 0001 (zeros followed by a 1), we could have used 1110 (ones followed by a 0) to create an equivalent code.

TABLE 8

Truncated run binarization (truncation value 6)

| Run value | Code word (non-truncated) (prefix-suffix) | Code word length | Code word truncated (prefix-suffix) | Code word length |
|---|---|---|---|---|
| 0 | 1 | 1 | 1 | 1 |
| 1 | 01 | 2 | 01 | 2 |
| 2 | 001-0 | 4 | 001-0 | 4 |
| 3 | 001-1 | 4 | 001-1 | 4 |
| 4 | 0001-00 | 6 | 000-0 | 4 |
| 5 | 0001-01 | 6 | 000-10 | 5 |
| 6 | 0001-10 | 6 | 000-11 | 5 |

Given a truncation value T≥2, it is necessary to determine k such that $2^k \leq T < 2^{k+1}$. Then, the highest unary prefix consists of (k+1) zeros. For a given run value x, if the prefix is the highest possible (k+1 zeros), then the suffix is the truncated binary code for $(x-2^k)$ with maximum possible value of $(T-2^k)$. To encode and decode the truncated binary code, some further calculations are necessary.

For truncated run binarization currently used in the HEVC SCC draft specification, the truncation value is the maximum possible run value if the run continues till the end of the block. If the traverse scan index for the current sample is n, and the number of sample in the block is p, the maximum possible run value is (p−1−n). Thus, the truncation value changes with each run. This makes it necessary to recalculate k and the truncated binary code (for the suffix) for each run, which may not be desirable. For instance, the recalculation of k and the truncated binary code may increase the complexity of run coding.

This disclosure presents techniques to reduce the complexity of run coding. Any of the proposed techniques or aspects in the disclosure can be applied independently or in combination with one or more of the other techniques.

In accordance with one or more techniques of this disclosure, a video coder may code a maximum run value for each palette block. For instance, for each palette block, the maximum run value for that block may be explicitly coded (signaled) in the bitstream by the encoder and received by a decoder. Then, this value may be used as the truncation value for run coding instead of using the truncation value based on the position of the current sample in the traverse scan. In some examples, the maximum run value should be greater than or equal to any run value that is actually signaled in the bitstream. In some examples, since last_run_type_flag may be sent before sending the run values, the last run value may never be explicitly signaled in the bitstream.

The maximum run value may be coded using fixed length, unary, exponential Golomb, Golomb-Rice, concatenation of Golomb-Rice and exponential Golomb codes. The truncated versions of these codes or truncated binary code may be used based on the maximum possible (truncation) value of (p−1), where p is the number of samples in the block.

In some examples, instead of coding the maximum run value for the entire block, the maximum run value corresponding to the COPY_INDEX_MODE when the index is greater than or equal to INDEX_THRESHOLD, may be signaled. In some of such examples, if the run corresponds to COPY_ABOVE_MODE or if the run corresponds to COPY_INDEX_MODE and the corresponding index is less than INDEX_THRESHOLD, a truncation value of (p−1) may be used, where p is the number of samples in the block. Instead of using (p−1) as the truncation value, non-truncated version of the code as shown in Table 8 may be used.

In some examples, if the run corresponds to COPY_INDEX_MODE and the corresponding index is greater than or equal to INDEX_THRESHOLD, the signaled maximum run value may be used as the truncation value. The INDEX_THRESHOLD may be known to both the encoder and the decoder or it may be sent in the bitstream, for example, in the VPS, SPS, PPS, slice header, etc.

In some examples, a flag may be sent at the palette block level to indicate whether such maximum run value is signaled in the bit-stream. If the flag is 0, the maximum run value may not be signaled in the bitstream. In this case, a truncation value of (p−1) may be used for all the coded runs, where p is the number of samples in the block. In some examples, non-truncated version of the code as shown in Table 8 may be used. If the flag is one, the signaling strategy described above may be followed. The flag may be context-coded or coded in bypass mode.

Coding a maximum run value for each palette block may present one or more advantages. For instance, by coding a maximum run value for each palette block, only one or two truncation values may be used per block, which may simplify run coding.

In some examples, the run binarization may be unchanged (except using non-truncated version in some cases), and only a different truncation value (not dependent on the sample position) may be used.

In accordance with one or more techniques of this disclosure, an index value, such as limit_run_index, may be signaled for each palette block. The limit_run_index may indicate that for runs corresponding to COPY_INDEX_MODE where the corresponding index value is greater than or equal to limit_run_index, and the coded run value is less than or equal to RUN_THRESHOLD. Thus, in this case, for runs corresponding to COPY_ABOVE_MODE and for runs corresponding to COPY_INDEX_MODE with corresponding index value less than limit_run_index, a truncation value of (p−1) may be used to code the run, where p is the number of samples in the block. In some examples, non-truncated version of the code as shown in Table 8 may be used.

In some examples, such as where the run corresponds to COPY_INDEX_MODE and the corresponding index is greater than or equal to limit index run, palette run coding may be invoked with truncation value set equal to RUN_THRESHOLD. The RUN_THRESHOLD may be known to both the encoder and the decoder or it may be sent in the bitstream, for example, in VPS, SPS, PPS, slice header, etc.

In some examples, the limit_run_index value may be coded using fixed length, unary, exponential Golomb, Golomb-Rice, concatenation of Golomb-Rice and exponential Golomb codes. The truncated versions of these codes or truncated binary code may be used based on the truncation value equal to maximum possible value for the palette index after considering the extra index allocated to escape value when the palette_esc_val_present_flag is 1.

In some examples, limit_run_index may be signaled only when the palette size (after accounting for the extra index to represent escape symbols when the palette_esc_val_present_flag is 1) is greater than INDEX_THRESHOLD_2. When limit_run_index is not signaled for a palette coded block, a truncation value of (p−1) may be used to code the runs, where p is the number of samples in the block. In some examples, non-truncated version of the code as shown in Table 8 may be used. In some examples, the INDEX_THRESHOLD_2 may be known to both the encoder and the decoder or it may be sent in the bitstream, for example in VPS, SPS, PPS, slice header, etc.

In some examples, a flag may be sent at the palette block level to indicate whether limit_run_index is signaled in the bit-stream. If the flag is 0, limit_run_index may not be signaled in the bitstream. In some of such examples, a truncation value of (p−1) may be used for all the coded runs, where p is the number of samples in the block. In some examples, a non-truncated version of the code, as shown in Table 8, may be used. If the flag is one, the signaling strategy described above may be followed. The flag may be context-coded or coded in bypass mode. The flag can be used with either of the two examples described in this section.

Coding an index value for each palette block may present one or more advantages. For instance, by coding an index value for each palette block, only one or two truncation values may be used per block, which may simplify run coding.

In some examples, the run binarization may be unchanged (except using non-truncated version in some cases), and only a different truncation value (not dependent on the sample position) may be used.

In Sun et al "CE1-related: Harmonization between JCTVC-T0065 Non CE1: Grouping Palette Indices At Front and CE1 Test A.1.5," Joint Collaborative Team on Video Coding (JCT-VC) of ITU-T SG 16 WP 3 and ISO/IEC JTC 1/SC 29/WG 11 20th Meeting: Geneva, CH, 10-18 Feb.

2015, JCTVC-T0233, a combination of copying of values from outside the palette block and grouping of indices in the beginning of the block was described. In this combination, the information about palette indices for the samples in the block is coded in the following order:

1. The number of palette indices to be coded (num_palette_indices_idc)
2. The actual palette indices (palette_index_idc)
3. last_palette_run_type_flag
4. The palette sample modes (COPY_ABOVE_MODE and COPY_INDEX_MODE) for the entire block
5. The run values for the entire block The run values of two or more consist of a prefix and a suffix. Up to 5 prefix bins are context coded. The remaining prefix bins and all the suffix bins are bypass coded. Grouping of bypass bins may increase CABAC throughput. Due to the truncated run coding, however, the truncation value for the next run is not known until the current run is fully decoded (prefix as well as suffix). This is because to calculate the position of the start of the next run, it is necessary to know the exact value of the current run, which may not be desirable. This limitation can be overcome as follows.

In accordance with one or more techniques of this disclosure, the truncated run coding in the current HEVC SCC text specification and test model is replaced by one of the techniques described above. As one example, the truncated run coding in the current HEVC SCC text specification and test model may be replaced by coding a maximum run value for each block. As another example, the truncated run coding in the current HEVC SCC text specification and test model may be replaced by coding an index value for each block. In this way, the dependency of run coding on the sample position in the traverse may be eliminated. Also, since the palette sample modes for all the samples in the block are already coded, the number of coded runs may be known as well. Due to this, all the prefixes of run values to be coded may be grouped together. This may be followed by grouping of all the suffixes of run values to be coded.

In one example of implementing techniques described above, a video coder (e.g. video encoder 20 or video decoder 30) may code, for a current block of video data and in a coded video bitstream, a syntax element that indicates a maximum run value used for the current block and code, for the current block of video data, a run value using the maximum run value as a truncation value. To code the syntax element, the video coder may code the syntax element using fixed length codes, unary codes, exponential Golomb codes, Golomb-Rice codes, or a concatenation of Golomb-Rice codes and exponential Golomb codes. The video coder may code a flag that indicates whether the syntax element is present in the bitstream.

In another example of implementing techniques described above, a video coder (e.g. video encoder 20 or video decoder 30) may code, for a current block of video data and in a coded video bitstream, a syntax element that indicates an index value used to code run values of the current block. The video coder may code, based on a first truncation value equal to a run threshold, run values of the current block that correspond to a copy index mode and have corresponding index values that are greater than or equal to the index value indicated by the syntax element. The video coder may code, based on a second truncation value that is based on the number of samples in the current block, run values of the current block that correspond to a copy above mode and have corresponding index values that are less than the index value indicated by the syntax element.

The video coder may code the syntax element using fixed length codes, unary codes, exponential Golomb codes, Golomb-Rice codes, or a concatenation of Golomb-Rice codes and exponential Golomb codes. The syntax element may, for example, be a limit_run index syntax element. The truncation value based on the number of samples in the current block may, for example, be one less than the number of samples in the current block. The run threshold may be coded in the coded video bitstream, may be predetermined, or may be determined in some other manner. The video coder may code the syntax element in response to a palette size for the current block being greater than a palette size threshold.

In the current SCC text specification and test model (JCTVC-T1005-v2), the palette index information for the samples in the palette block is sent in the following order:

1. The number of coded indices (num_palette_indices_idc)
2. Palette indices corresponding to COPY_INDEX_MODE (palette_index_idc)
3. last_palette_run_type_flag
4. run type (last_run_type_flag)
5. run value
6. escape sample values The run types and run values are interleaved. In this case, all the indices are grouped in front and coded using truncated binary coding. The truncation value for the palette index coding is MaxPaletteIndex which is derived as follows:

CurrentPaletteSize=NumPredictedPaletteEntries+num_signalled_palette_entries

MaxPaletteIndex=CurrentPaletteSize−1+palette_escape_val_present_flag.

If the above order is changed so that the index information is grouped towards the end of the block (e.g. after run values but before escape sample values) or if the run type, run value and palette index are interleaved such that palette index is signaled after the run value, then it may be possible to improve the coding efficiency of signaling the palette indices. It should be noted that the methods are applicable only when run type (or palette sample mode) is COPY_INDEX_MODE, as palette index needs to be coded only for this mode.

When palette indices are signaled after corresponding run values (either interleaved or grouped at the end of the block), we propose improvements to coding of palette indices based on the corresponding run values. Any of the proposed methods or aspects in the disclosure can be applied independently or in combination with each other or with the existing method.

In one example technique of this disclosure, video encoder 20 may signal, and video decoder 30 may receive, a syntax element at the block level for a palette block, to specify the maximum palette index value that occurs when the run is greater than or equal to RUN_THRESHOLD. Let such a value be denoted by MaxPaletteInexRestricted. Then, when the run value is greater than or equal to RUN_THRESHOLD, for coding the index, truncated binary coding with the truncation value of MaxPaletteInexRestricted is invoked. If the run value is less than RUN_THRESHOLD, truncated binary coding with the truncation value of maxPaletteIndex is invoked. Since MaxPaletteIndexRestricted is always less than or equal to MaxPaletteIndex, this may result in bit-savings for index coding. In one example implementation, a RUN_THRESHOLD value equal to 1 may be used.

The RUN_THRESHOLD may be known to both the encoder and the decoder or it may be sent in the bitstream, for example in the VPS, SPS, PPS, slice header, etc.

MaxPaletteIndexRestricted may be coded directly using fixed length, unary, exponential Golomb, Golomb-Rice, concatenation of Golomb-Rice and exponential Golomb codes. The truncated versions of these codes or truncated binary code may be used based on the truncation value equal to MaxPaletteIndex.

Instead of coding MaxPaletteIndexRestricted directly, it may be predictively coded with respect to MaxPaletteIndex. In one example implementation, a symbol S=(MaxPaletteIndex−MaxPaletteIndexRestricted) is coded. It may be coded using fixed length, unary, exponential Golomb, Golomb-Rice, concatenation of Golomb-Rice and exponential Golomb codes. The truncated versions of these codes or truncated binary code may be used based on the truncation value equal to MaxPaletteIndex. In one example implementation, truncated exponential code of order 0 (truncated EG0) is used. Furthermore, the source symbols are re-arranged as follows. If the symbol, (MaxPaletteIndex−MaxPaletteIndexRestricted) is equal to 0 or 1, it is mapped to 0 and 1, respectively. If the symbol S is equal to MaxPaletteIndex, it is mapped to 2. To accommodate this, symbols from 2 to (MaxPaletteIndex−1) are incremented by 1. In one example implementation, if the symbol S is equal to MaxPaletteIndex−1, it is mapped to 2. To accommodate this, symbols from 2 to (MaxPaletteIndex−2) are incremented by 1.

According to another technique of this disclosure, a flag may be signaled at the block level to indicate whether such maximum palette index value when run is greater than or equal to RUN_THRESHOLD is signaled. If the flag is 0, it indicates that MaxPaletteInexRestricted is equal to MaxPaletteInex. In this case, all the indices are coded using truncated binary coding with a truncation value of MaxPaletteIndex. Otherwise, MaxPaletteIndexRestricted is signaled by the encoder and received by the decoder, and it may be inferred that it is less than MaxPaletteIndex. In this case, (MaxPaletteIndex−MaxPaletteIndexRestricted−1) may be signaled. The flag may be context-coded or bypass-coded.

It should be noted that when (MaxPaletteIndex−MaxPaletteIndexRestricted) is coded using truncated EG0 or EG0 or any other code where the first bin indicates whether the first symbol is non-zero, this is equivalent to sending a flag as described above.

According to another technique of this disclosure, a block level flag is signaled to indicate that when the run is greater than or equal to RUN_THRESHOLD, the palette index is not coded and is inferred to 0. Thus, when the flag is 0, all the indices are coded using truncated binary coding with a truncation value of MaxPaletteIndex. Similarly, when the flag is 1 and the run is less than RUN_THRESHOLD, the index is also coded using truncated binary coding with a truncation value of MaxPaletteIndex. When the flag is 1 and the run is greater than or equal to RUN_THRESHOLD, index is not coded, but inferred to be 0.

The RUN_THRESHOLD may be known to both the encoder and the decoder or it may be sent in the bitstream, for example in the VPS, SPS, PPS, slice header, etc.

The first bin or the first several bins of (MaxPaletteIndex−MaxPaletteIndexRestricted) may be coded using multiple CABAC contests. The contexts may depend on palette size and/or MaxPaletteIndex and or block size and or number of indices and/or number of runs and/or number of copy above runs and/or number of index copy runs.

According to another technique of this disclosure, a syntax element, limit_run_value, is signaled to indicate that if the run is greater than or equal to limit_run_value, the maximum possible index value is less than or equal to INDEX_THRESHOLD. If MaxPaletteIndex for a block is less than or equal to INDEX_THRESHOLD, limit_run_value is not coded. In this case, all the indices are coded using truncated binary coding with a truncation value of MaxPaletteInex. Otherwise, limit_run_value is signaled. In this case, if the run is greater than or equal to limit_run_value, the index is coded using truncated binary coding with a truncation value of INDEX_THRESHOLD. If the run is less than limit_run_value, the index is coded using truncated binary coding with a truncation value of MaxPaletteInex.

The INDEX_THRESHOLD may be known to both the encoder and the decoder or it may be sent in the bitstream, for example in the VPS, SPS, PPS, slice header, etc. The syntax element "limit_run_value" may be coded using fixed length, unary, exponential Golomb, Golomb-Rice, or concatenation of Golomb-Rice and exponential Golomb codes. The truncated versions of these codes or truncated binary code may be used based on the truncation value equal to block size minus one.

When MaxPaletteIndex for a block is greater than INDEX_THRESHOLD, a block level flag may be signaled to indicate whether limit_run_value is coded. If it is not coded, all the indices are coded using truncated binary coding with a truncation value of MaxPaletteInex. If the flag is 1, limit_run_value is coded and index coding is performed according to the techniques described above.

In an example of implementing techniques described above, a video coder (e.g. video encoder 20 or video decoder 30) may determine that a block of video data is coded using a palette mode and determine a first maximum palette index value. The video coder may determine a second maximum palette index value. The second maximum palette index value may be a maximum palette index value for when a run is greater than or equal to a run threshold value, and the second maximum palette index value may be less than the first maximum palette index value. In response to a run value being greater than or equal to the run threshold value, the video coder may code an index value using truncated binary coding with a truncation value equal to the second maximum palette index value. The video coder may also, in response to the run value being less than the run threshold value, code the index value using truncated binary coding with a truncation value equal to the first maximum palette index value. The first maximum palette index value may be the prediction of the second maximum palette index value. To determine the second maximum palette index value, the video coder (if performing video decoding) may receive block-level signaling indicating the second maximum palette index value.

The video coder may signal, for example by transmitting signaling information or receiving signaling information, the run threshold value, for example, in one or more of a VPS, SPS, PPS, or slice header. The run threshold value may alternatively be defined by a video CODEC.

To determine the second maximum palette index value, the video coder may signal an indication of the second maximum palette index value. The indication may, for example, be coded using one or more of fixed length coding, unary coding, exponential Golomb coding, Golomb-Rice coding, or a concatenation of Golomb-Rice and exponential Golomb codes. The indication may also be coded using a truncated version of a coding techniques above or truncated binary coding. The truncation value may be equal to the first maximum palette index value.

To determine the second maximum palette index value, the video coder may predict the second maximum palette index value and signal a difference between the prediction and the second maximum palette index value. The video coder may code the difference using one or more of fixed length coding, unary coding, exponential Golomb coding, Golomb-Rice coding, or a concatenation of Golomb-Rice and exponential Golomb codes. The difference may also be coded using a truncated version of a coding technique recited above or truncated binary coding. The truncation value may be equal to the first maximum palette index value.

In another example of implementing techniques described above, a video coder determines that a block of video data is coded using a palette mode and determines a maximum palette index value for the block of video data. The video coder determines an index threshold value, and in response to the first maximum palette index value being greater than the index threshold, determines a run limit value. In response to a run value being greater than or equal to the run limit value, the video coder codes an index value using truncated binary coding with a truncation value equal to the index threshold value. The video coder may signal, for example, by transmitting signaling information or receiving signaling information, the run threshold value, for example, in one or more of a VPS, SPS, PPS, or slice header. The run threshold value may alternatively be defined by a video CODEC.

In response to the first maximum palette index value being less than or equal to the index threshold, the video coder may code the index value using truncated binary coding with a truncation value equal to the maximum palette index value. To determine the second maximum palette index value, the video coder may signal an indication of the second maximum palette index value. The indication may, for example, be coded using one or more of fixed length coding, unary coding, exponential Golomb coding, Golomb-Rice coding, or a concatenation of Golomb-Rice and exponential Golomb codes. The indication may also be coded using a truncated version of a coding techniques above or truncated binary coding. The truncation value may be equal to the first maximum palette index value.

Figure 5:
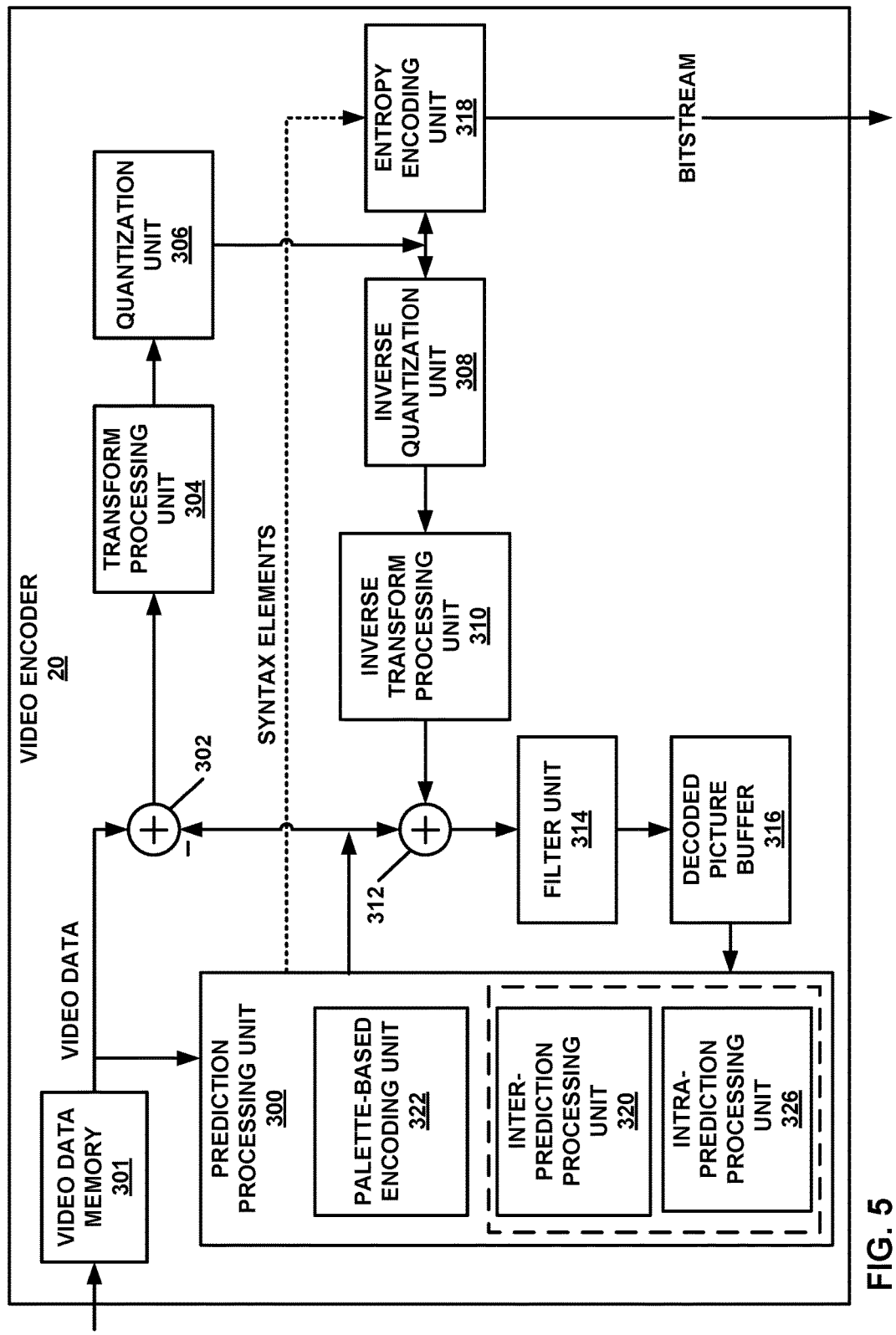
FIG. 5 is a block diagram illustrating an example video encoder that may implement the techniques described in this disclosure.

FIG. 5 is a block diagram illustrating an example video encoder 20 that may implement the techniques of this disclosure. FIG. 5 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 represents an example of a device that may be configured to perform techniques for palette-based video coding in accordance with various examples described in this disclosure.

In the example of FIG. 5, video encoder 20 includes a prediction processing unit 300, video data memory 301, a residual generation unit 302, a transform processing unit 304, a quantization unit 306, an inverse quantization unit 308, an inverse transform processing unit 310, a reconstruction unit 312, a filter unit 314, a decoded picture buffer 316, and an entropy encoding unit 318. Prediction processing unit 300 includes an inter-prediction processing unit 320 and an intra-prediction processing unit 326. Inter-prediction processing unit 320 includes a motion estimation unit and a motion compensation unit (not shown). Video encoder 20 also includes a palette-based encoding unit 322 configured to perform various aspects of the palette-based coding techniques described in this disclosure. In other examples, video encoder 20 may include more, fewer, or different functional components.

Video data memory 301 may be configured to store video data to be encoded by the components of video encoder 20. The video data stored in video data memory 301 may be obtained, for example, from video source 18. Decoded picture buffer 316 may be a reference picture memory that stores reference video data for use in encoding video data by video encoder 20, e.g., in intra- or inter-coding modes. Video data memory 301 and decoded picture buffer 316 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 301 and decoded picture buffer 316 may be provided by the same memory device or separate memory devices. In various examples, video data memory 301 may be on-chip with other components of video encoder 20, or off-chip relative to those components.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 300 may perform quad-tree partitioning to divide the CTBs of the CTU into progressively-smaller blocks. The smaller block may be coding blocks of CUs. For example, prediction processing unit 300 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 300 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 320 may generate predictive data for a PU by performing inter prediction on each PU of a CU. The predictive data for the PU may include predictive blocks of the PU and motion information for the PU. Inter-prediction processing unit 320 may perform different operations for a PU of a CU depending on whether the PU is in an I slice, a P slice, or a B slice. In an I slice, all PUs are intra predicted. Hence, if the PU is in an I slice, inter-prediction processing unit 320 does not perform inter prediction on the PU. Thus, for blocks encoded in I-mode, the predicted block is formed using spatial prediction from previously-encoded neighboring blocks within the same frame. If a PU is in a P slice, inter-prediction processing unit 320 may use uni-directional inter prediction to generate a predictive block of the PU. If a PU is in a B slice, inter-prediction processing unit 320 may use uni-directional or bi-directional inter prediction to generate a predictive block of the PU.

In accordance with various examples of this disclosure, video encoder 20 may be configured to perform palette-based coding. With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the disclosed processes described herein (throughout this disclosure) in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

Palette-based encoding unit 322, for example, may perform palette-based decoding when a palette-based encoding mode is selected, e.g., for a CU or PU. For example, palette-based encoding unit 322 may be configured to generate a palette having entries indicating pixel values, select pixel values in a palette to represent pixels values of at least some positions of a block of video data, and signal information associating at least some of the positions of the block of video data with entries in the palette corresponding, respectively, to the selected pixel values. Although various functions are described as being performed by palette-based encoding unit 322, some or all of such functions may be performed by other processing units, or a combination of different processing units.

Intra-prediction processing unit 326 may generate predictive data for a PU by performing intra prediction on the PU. The predictive data for the PU may include predictive blocks of the PU and various syntax elements. Intra-prediction processing unit 326 may perform intra prediction on PUs in I slices, P slices, and B slices.

To perform intra prediction on a PU, intra-prediction processing unit 326 may use multiple intra prediction modes to generate multiple sets of predictive data for the PU. Intra-prediction processing unit 326 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 326 may use various numbers of intra prediction modes, e.g., 33 directional intra prediction modes. In some examples, the number of intra prediction modes may depend on the size of the region associated with the PU.

Prediction processing unit 300 may select the predictive data for PUs of a CU from among the predictive data generated by inter-prediction processing unit 320 for the PUs or the predictive data generated by intra-prediction processing unit 326 for the PUs. In some examples, prediction processing unit 300 selects the predictive data for the PUs of the CU based on rate/distortion metrics of the sets of predictive data. The predictive blocks of the selected predictive data may be referred to herein as the selected predictive blocks.

Residual generation unit 302 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 302 may generate the residual blocks of the CU such that each sample in the residual blocks has a value equal to a difference between a sample in a coding block of the CU and a corresponding sample in a corresponding selected predictive block of a PU of the CU.

Transform processing unit 304 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 304 may generate transform coefficient blocks for each TU of a CU by applying one or more transforms to the transform blocks of the TU. Transform processing unit 304 may apply various transforms to a transform block associated with a TU. For example, transform processing unit 304 may apply a discrete cosine transform (DCT), a directional transform, or a conceptually similar transform to a transform block. In some examples, transform processing unit 304 does not apply transforms to a transform block. In such examples, the transform block may be treated as a transform coefficient block.

Quantization unit 306 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 306 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 308 and inverse transform processing unit 310 may apply inverse quantization and inverse transforms to a coefficient block, respectively, to reconstruct a residual block from the coefficient block. Reconstruction unit 312 may add the reconstructed residual block to corresponding samples from one or more predictive blocks generated by prediction processing unit 300 to produce a reconstructed transform block associated with a TU. By reconstructing transform blocks for each TU of a CU in this way, video encoder 20 may reconstruct the coding blocks of the CU.

Filter unit 314 may perform one or more deblocking operations to reduce blocking artifacts in the coding blocks associated with a CU. Decoded picture buffer 316 may store the reconstructed coding blocks after filter unit 314 performs the one or more deblocking operations on the reconstructed coding blocks. Inter-prediction processing unit 320 may use a reference picture that contains the reconstructed coding blocks to perform inter prediction on PUs of other pictures. In addition, intra-prediction processing unit 326 may use reconstructed coding blocks in decoded picture buffer 316 to perform intra prediction on other PUs in the same picture as the CU.

Entropy encoding unit 318 may receive data from other functional components of video encoder 20. For example, entropy encoding unit 318 may receive coefficient blocks from quantization unit 306 and may receive syntax elements from prediction processing unit 300. Entropy encoding unit 318 may perform one or more entropy encoding operations on the data to generate entropy-encoded data. For example, entropy encoding unit 318 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 318. For instance, the bitstream may include data that represents a RQT for a CU.

In accordance with an example technique of this disclosure, entropy encoding unit 318 may include, in a bitstream, first entropy encoded data corresponding to a set of run-related syntax element groups for a current block of a current picture of the video data. Entropy encoding unit 318 may include, in the bitstream, second entropy encoded data corresponding to a set of palette index syntax elements for the current block, the first entropy encoded data occurring in the bitstream before the second entropy encoded data. In this example, each respective run-related syntax element group of the set of run-related syntax element groups indicates a respective type of a respective run of identical palette mode type indicators and a respective length of the respective run. Furthermore, in this example, each respective palette index syntax element of the set of palette index syntax elements indicates an entry in a palette comprising a set of sample values.

Figure 6:
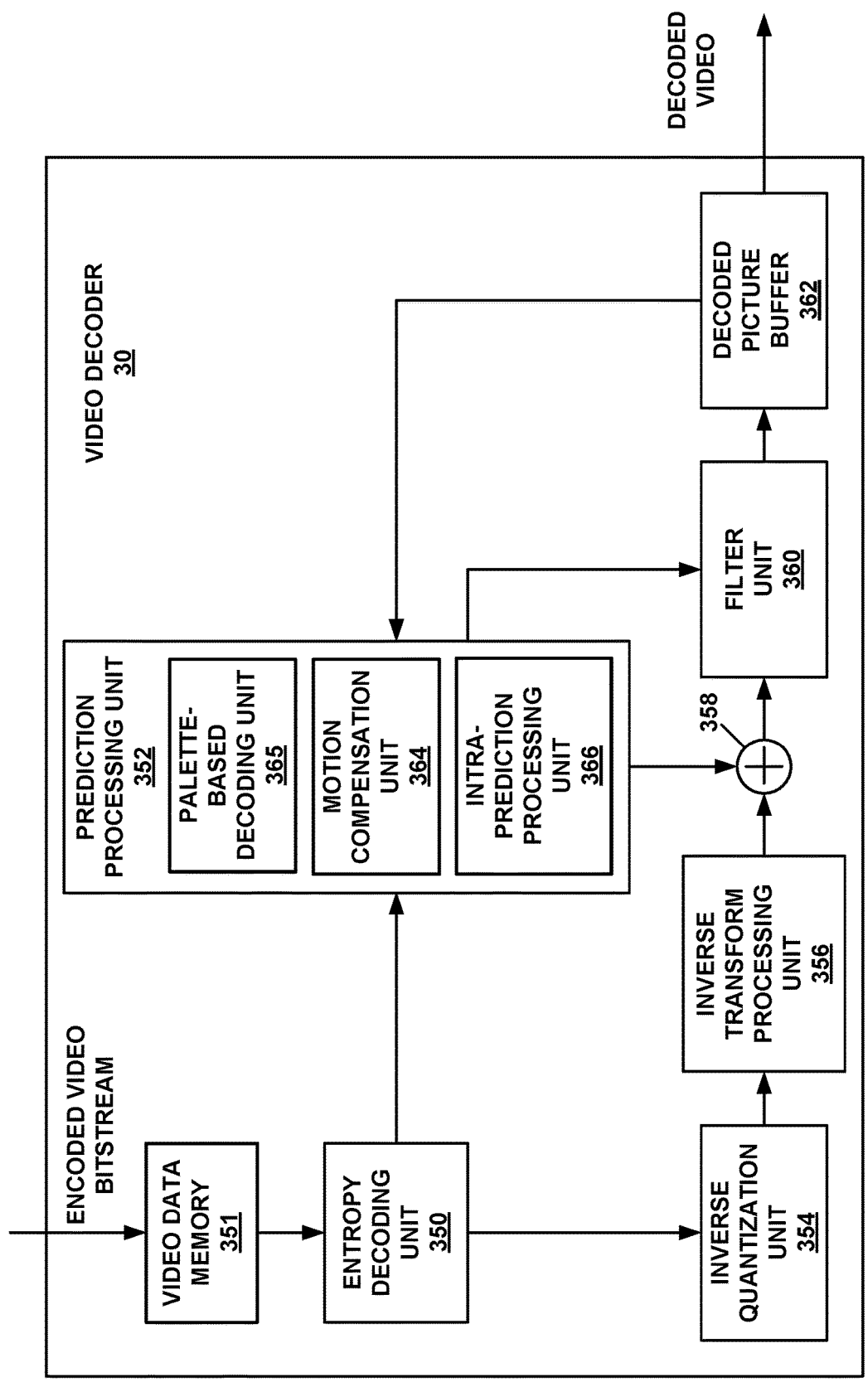
FIG. 6 is a block diagram illustrating an example video decoder that may implement the techniques described in this disclosure.

FIG. 6 is a block diagram illustrating an example video decoder 30 that is configured to implement the techniques of this disclosure. FIG. 6 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video encoder 20 represents an example of a device that may be configured to perform techniques for palette-based video coding in accordance with various examples described in this disclosure. For example, video encoder 20 may be configured to selectively decode various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Version 1. Video decoder 30, in one example, may be configured to generate a palette having entries indicating pixel values, receive information associating at least some pixel locations in a block of video data with entries in the palette, select pixel values in the palette based on the information, and reconstruct pixel values of the block based on the selected pixel values in the palette.

In the example of FIG. 6, video decoder 30 includes an entropy decoding unit 350, video data memory 351, a prediction processing unit 352, an inverse quantization unit 354, an inverse transform processing unit 356, a reconstruction unit 358, a filter unit 360, and a decoded picture buffer 362. Prediction processing unit 352 includes a motion compensation unit 364 and an intra-prediction processing unit 366. Video decoder 30 also includes a palette-based decoding unit 365 configured to perform various aspects of the palette-based coding techniques described in this disclosure. In other examples, video decoder 30 may include more, fewer, or different functional components.

Video data memory 351 may store video data, such as an encoded video bitstream, to be decoded by the components of video decoder 30. The video data stored in video data memory 351 may be obtained, for example, from computer-readable medium 36, e.g., from a local video source, such as a camera, via wired or wireless network communication of video data, or by accessing physical data storage media. Video data memory 351 may form a coded picture buffer (CPB) that stores encoded video data from an encoded video bitstream. Decoded picture buffer 362 may be a reference picture memory that stores reference video data for use in decoding video data by video decoder 30, e.g., in intra- or inter-coding modes. Video data memory 351 and decoded picture buffer 362 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 351 and decoded picture buffer 362 may be provided by the same memory device or separate memory devices. In various examples, video data memory 351 may be on-chip with other components of video decoder 30, or off-chip relative to those components.

The video data memory 351 receives and stores encoded video data (e.g., NAL units) of a bitstream. Entropy decoding unit 350 may receive encoded video data (e.g., NAL units) from the CPB and parse the NAL units to obtain syntax elements. Entropy decoding unit 350 may entropy decode entropy-encoded syntax elements in the NAL units. Prediction processing unit 352, inverse quantization unit 354, inverse transform processing unit 356, reconstruction unit 358, and filter unit 360 may generate decoded video data based on the syntax elements extracted from the bitstream. Entropy decoding unit 350 may perform a process generally reciprocal to that of entropy encoding unit 318.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 354 may inverse quantize, i.e., de-quantize, coefficient blocks associated with the TU. Inverse quantization unit 354 may use a QP value associated with the CU of the TU to determine a degree of quantization and, likewise, a degree of inverse quantization for inverse quantization unit 354 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 354 inverse quantizes a coefficient block, inverse transform processing unit 356 may apply one or more inverse transforms to the coefficient block in order to generate a residual block associated with the TU. For example, inverse transform processing unit 356 may apply an inverse DCT, an inverse integer transform, an inverse Karhunen-Loeve transform (KLT), an inverse rotational transform, an inverse directional transform, or another inverse transform to the coefficient block.

In accordance with an example technique of this disclosure, entropy decoding unit 350 may determine, based on first entropy encoded data in a bitstream, a set of run-related syntax element groups for a current block of a current picture of the video data. Additionally, entropy decoding unit 350 may determine, based on second entropy encoded data the bitstream, a set of palette index syntax elements for the current block, the first entropy encoded data occurring in the bitstream before the second entropy encoded data. In this example, each respective run-related syntax element group of the set of run-related syntax element groups indicates a respective type of a respective run of identical palette mode type indicators and a respective length of the respective run. In this example, each respective palette index syntax element of the set of palette index syntax elements indicates an entry in a palette comprising a set of sample values. Other components of video decoder 30 may reconstruct, based on the sample values in the palette, the current block. For instance, palette-based decoding unit 365 may use sample values in the palette to generate a predictive block for a PU of a CU.

If a PU is encoded using intra prediction, intra-prediction processing unit 366 may perform intra prediction to generate predictive blocks of the PU. Intra-prediction processing unit 366 may use an intra prediction mode to generate the predictive blocks of the PU based on samples spatially-neighboring blocks. Intra-prediction processing unit 366 may determine the intra prediction mode for the PU based on one or more syntax elements obtained from the bitstream.

If a PU is encoded using inter prediction, entropy decoding unit 350 may determine motion information for the PU. Motion compensation unit 364 may determine, based on the motion information of the PU, one or more reference blocks. Motion compensation unit 364 may generate, based on the one or more reference blocks, predictive blocks (e.g., predictive luma, Cb and Cr blocks) for the PU.

Reconstruction unit 358 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 358 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 360 may perform a deblocking operation to reduce blocking artifacts associated with the coding blocks of the CU. Video decoder 30 may store the coding blocks of the CU in decoded picture buffer 362. Decoded picture buffer 362 may provide reference pictures for subsequent motion compensation, intra prediction, and presentation on a display device, such as display device 32 of FIG. 1. For instance, video decoder 30 may perform, based on the blocks in decoded picture buffer 362, intra prediction or inter prediction operations for PUs of other CUs.

Video decoder 30 may be configured to perform palette-based coding. For example, palette-based decoding unit 365 may perform palette-based decoding when a palette-based decoding mode is selected, e.g., for a CU or PU. For example, palette-based decoding unit 365 may generate a palette having entries indicating pixel values, receive information associating at least some pixel locations in a block of video data with entries in the palette, select pixel values in the palette based on the information, and reconstruct pixel values of the block based on the selected pixel values in the palette. Although various functions are described as being performed by palette-based decoding unit 365, some or all of such functions may be performed by other processing units, or a combination of different processing units.

Palette-based decoding unit 365 may receive palette coding mode information, and perform the above operations when the palette coding mode information indicates that the palette coding mode applies to the block. When the palette coding mode information indicates that the palette coding mode does not apply to the block, or when other mode information indicates the use of a different mode, palette-based decoding unit 365 decodes the block of video data using a non-palette based coding mode, e.g., such an HEVC inter-predictive or intra-predictive coding mode. The block of video data may be, for example, a CU or PU generated according to an HEVC coding process. The palette-based coding mode may comprise one of a plurality of different palette-based coding modes, or there may be a single palette-based coding mode.

It should be understood that all of the techniques described herein may be used individually or in combination. It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to the HEVC standard for purposes of illustration. However, the techniques described in this disclosure may be useful for other video coding processes, including other standard or proprietary video coding processes not yet developed.

The techniques described above may be performed by video encoder 20 (FIG. 1 and FIG. 5) and/or video decoder 30 (FIGS. 1 and 6), both of which may be generally referred to as a video coder. Likewise, video coding may refer to video encoding or video decoding, as applicable.

Figure 7:
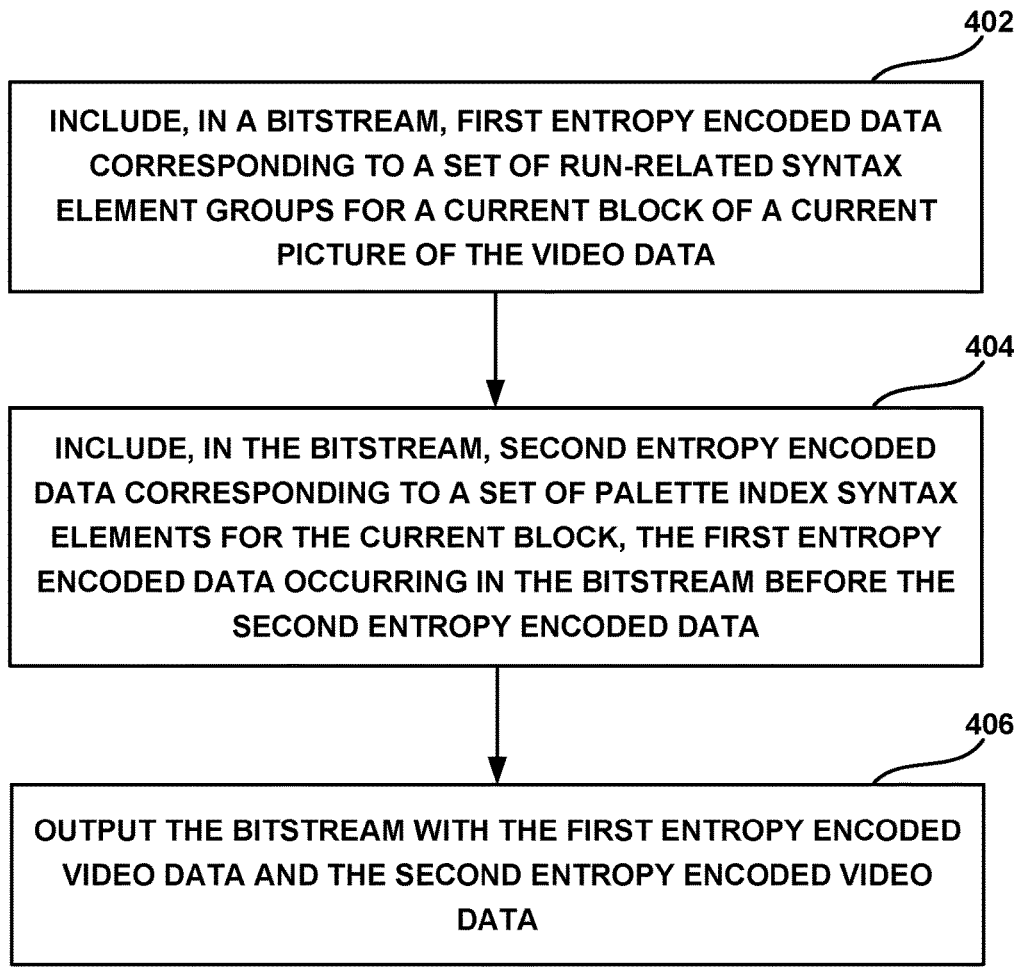
FIG. 7 is a flowchart illustrating an example method for encoding video data in accordance with the techniques of this disclosure.

FIG. 7 is a flowchart illustrating an example method for encoding video data in accordance with the techniques of this disclosure. The techniques of FIG. 7 will be described with respect to video encoder 20 of FIGS. 1 and 5, although the techniques of FIG. 7 are not limited to any particular type of video encoder. In the example of FIG. 7, video encoder 20 includes, in a bitstream, first entropy encoded data corresponding to a set of run-related syntax element groups for a current block of a current picture of the video data (402). Video encoder 20 includes, in the bitstream, second entropy encoded data corresponding to a set of palette index syntax elements for the current block, the first entropy encoded data occurring in the bitstream before the second entropy encoded data (404). Each respective run-related syntax element group of the set of run-related syntax elements groups indicates a respective type of a respective run of identical palette mode type indicators and a respective length of the respective run, and each respective palette index syntax element of the set of palette index syntax elements indicates an entry in a palette comprising a set of sample values. Video encoder 20 outputs the bitstream with the first entropy encoded video data and the second entropy encoded video data (406).

To include the first entropy encoded data, for each respective run-related syntax element group of the set of run-related syntax element groups, video encoder 20 selects, from a plurality of entropy coding contexts, a respective entropy coding context for the respective run-related syntax element group, wherein the selection of the respective entropy coding context is not dependent on any of the palette index syntax elements, and entropy encodes, based on the selected entropy coding context, a bin of the respective run-related syntax element group. To select the entropy coding context, video encoder 20 selects, based on a position within the current block of a starting pixel of a respective run corresponding to the respective run-related syntax element group, the respective entropy coding context for the respective run-related syntax element group. Additionally or alternatively, to select the entropy coding context, video encoder 20 selects, based on a size of the palette, the respective entropy coding context for the respective run-related syntax element group.

To include the second entropy encoded data, for each respective palette index syntax element of the set of palette index syntax element elements, video encoder 20 may determine, based on a number of consecutive locations with the same palette index, a binarization method and generate a binarized version of the respective palette index syntax element using the determined binarization method. Video encoder 20 may entropy encode the binarized version of the respective index syntax element and include, in the bitstream, the entropy encoded binarized version of the respective palette index syntax element.

To obtain the set of palette index syntax elements, video encoder 20 may, for each respective palette index syntax element of the set of palette index syntax element elements, determine a binarization method based on a palette size, generate a binarized version of the respective palette index syntax element using the determined binarization method, entropy encode the binarized version of the respective index syntax element, and include, in the bitstream, the entropy encoded binarized version of the respective palette index syntax element. Different values of the palette size may correspond to different binarization methods. Video encoder 20 may also perform a palette size adjustment process to produce an adjusted palette size.

To obtain the set of palette index syntax elements, for each respective palette index syntax element of the set of palette index syntax element elements, video encoder 20 may determine a binarization method based on a palette size and a number of consecutive locations with the same palette index, generate a binarized version of the respective palette index syntax element using the determined binarization method, entropy encode the binarized version of the respective index syntax element, and include, in the bitstream, the entropy encoded binarized version of the respective palette index syntax element. Video encoder 20 may also perform a palette size adjustment process to produce an adjusted palette size.

Figure 8:
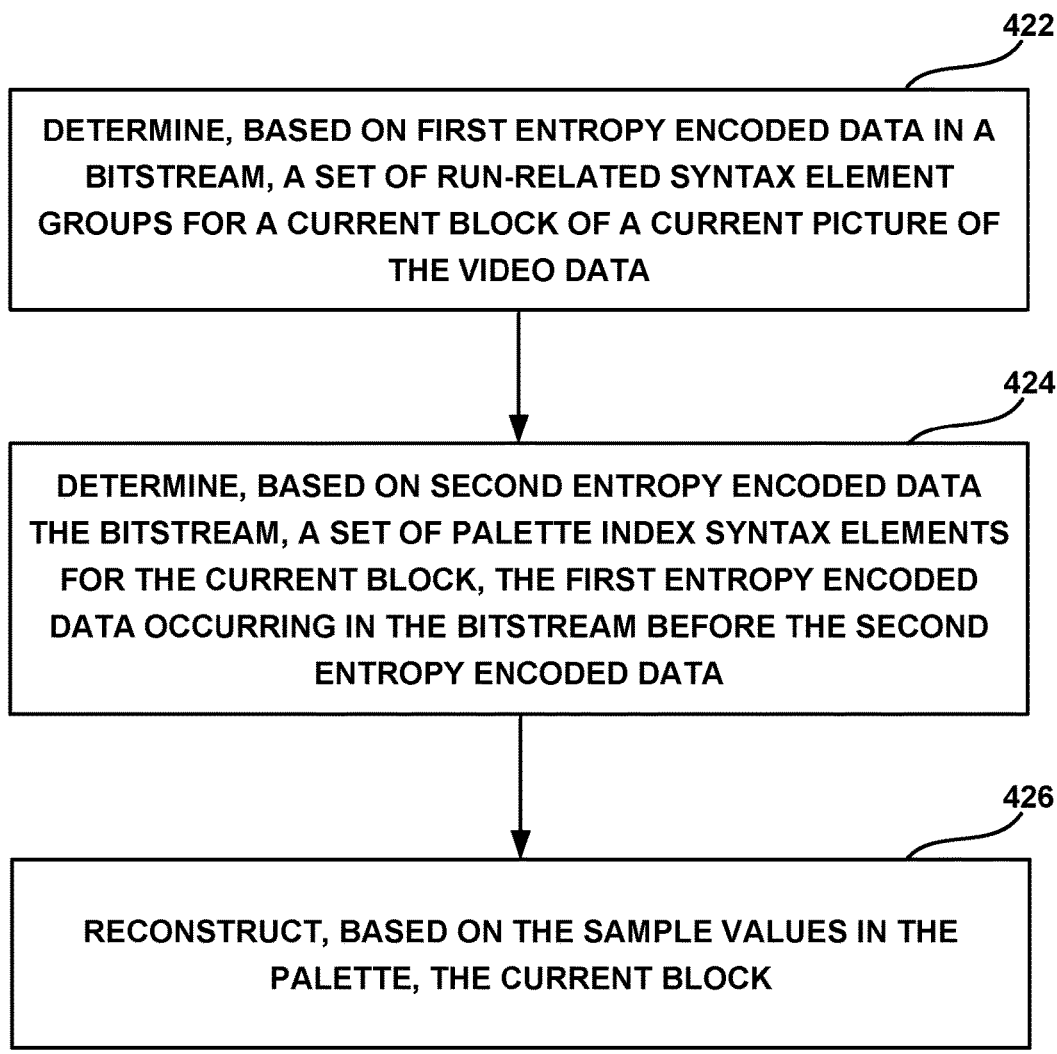
FIG. 8 is a flowchart illustrating an example method for encoding video data in accordance with the techniques of this disclosure.

FIG. 8 is a flowchart illustrating an example method for decoding video data in accordance with the techniques of this disclosure. The techniques of FIG. 8 will be described with respect to video decoder 30 of FIGS. 1 and 6, although the techniques of FIG. 8 are not limited to any particular type of video decoder. In the example of FIG. 8, video decoder 30 determines, based on first entropy encoded data in a bitstream, a set of run-related syntax element groups for a current block of a current picture of the video data (422). Video decoder 30 determines, based on second entropy encoded data the bitstream, a set of palette index syntax elements for the current block, the first entropy encoded data occurring in the bitstream before the second entropy encoded data (424). Each respective run-related syntax element group of the set of run-related syntax element groups indicates a respective type of a respective run of identical palette mode type indicators and a respective length of the respective run, and each respective palette index syntax element of the set of palette index syntax elements indicates an entry in a palette comprising a set of sample values. Video decoder 30 reconstructs, based on the sample values in the palette, the current block (426).

To determine the set of run-related syntax element groups comprises, for each respective run-related syntax element group of the set of run-related syntax element groups, video decoder 30 selects a respective entropy coding context for the respective run-related syntax element group from a plurality of entropy coding contexts and entropy decodes, based on the selected entropy coding context, a bin of the respective run-related syntax element group. The selection of the respective entropy coding context may not be dependent on any of the palette index syntax elements. To select the entropy coding context, video decoder 30 may select, based on a position within the current block of a starting pixel of a respective run corresponding to the respective run-related syntax element group, the respective entropy coding context for the respective run-related syntax element group. To select the entropy coding context, video decoder 30 may select, based on a size of the palette, the respective entropy coding context for the respective run-related syntax element group.

To determine the set of palette index syntax elements, for each respective palette index syntax element of the set of palette index syntax element elements, video decoder 30 obtains, from the bitstream, data corresponding to a respective palette index syntax element and entropy decodes the data corresponding to the respective palette index syntax element to determine a binarized version of the respective palette index syntax element. Video decoder 30 may also determine a binarization method based on a number of consecutive locations with the same palette index and determine the respective palette index syntax element using the determined binarization method to debinarize the binarized version of the respective palette index syntax element.

To determine the set of palette index syntax elements, video decoder 30 may, for each respective palette index syntax element of the set of palette index syntax element elements, obtain, from the bitstream, data corresponding to a respective palette index syntax element and entropy decode the data corresponding to the respective palette index syntax element to determine a binarized version of the respective palette index syntax element. Video decoder 30 may also determine a binarization method based on a palette size and determine the respective palette index syntax element using the determined binarization method to debinarize the binarized version of the respective palette index syntax element. Different values of the palette size may correspond to different binarization methods. Video decoder 30 may perform a palette size adjustment process to produce an adjusted palette size.

To determine the set of palette index syntax elements, for each respective palette index syntax element of the set of palette index syntax element elements, video decoder 30 may obtain, from the bitstream, data corresponding to a respective palette index syntax element and entropy decode the data corresponding to the respective palette index syntax element to determine a binarized version of the respective palette index syntax element. Video decoder 30 may also determine a binarization method based on a palette size and a number of consecutive locations with the same palette index and determine the respective palette index syntax element using the determined binarization method to debinarize the binarized version of the respective palette index syntax element. Video decoder 30 may perform a palette size adjustment process to produce an adjusted palette size.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving a bitstream of encoded video data;
   determining, based on first entropy encoded data in the bitstream, a set of run-related syntax element groups for a current block of a current picture of the video data;
   determining, based on second entropy encoded data in the bitstream, a set of palette index syntax elements for the current block, the first entropy encoded data occurring in the bitstream before the second entropy encoded data, wherein:
      each respective run-related syntax element group of the set of run-related syntax element groups comprises a respective syntax element indicating a length of the respective run, and
      each respective palette index syntax element of the set of palette index syntax elements indicates an entry in a palette comprising a set of sample values;
   wherein determining the set of run-related syntax element groups for the current block comprises, for each respective run-related syntax element group of the set of run-related syntax element groups:
      selecting, from a plurality of entropy coding contexts, a respective entropy coding context for the respective run-related syntax element group, wherein the selecting is:
         not dependent on any of the palette index syntax elements, and
         dependent on one or both of a position within the current block of a starting pixel of a respective run corresponding to the respective run-related syntax element group or a size of the palette, and
      entropy decoding, based on the selected entropy coding context, a bin of the respective run-related syntax element group;
   wherein determining the set of palette index syntax elements comprises, for each respective palette index syntax element of the set of palette index syntax elements:

obtaining, from the bitstream, data corresponding to a respective one of the palette index syntax elements; and entropy decoding the data corresponding to the respective palette index syntax element to determine a respective entry in the palette;

reconstructing, based on the respective syntax elements indicating the respective entries in the palette and the respective syntax elements indicating the length of the respective runs, the current block; and outputting video data comprising a decoded version of the reconstructed current block.

2. The method of claim 1, wherein determining the set of palette index syntax elements further comprises:

for each respective palette index syntax element of the set of palette index syntax elements:

entropy decoding the data corresponding to the respective palette index syntax element to determine a binarized version of the respective palette index syntax element;

determining, based on a number of consecutive locations with the same palette index, a binarization method; and determining the respective palette index syntax element using the determined binarization method to debinarize the binarized version of the respective palette index syntax element.

3. The method of claim 1, wherein determining the set of palette index syntax elements further comprises:

for each respective palette index syntax element of the set of palette index syntax elements:

entropy decoding the data corresponding to the respective palette index syntax element to determine a binarized version of the respective palette index syntax element;

determining, based on a palette size, a binarization method; and determining the respective palette index syntax element using the determined binarization method to debinarize the binarized version of the respective palette index syntax element.

4. The method of claim 1, wherein determining the set of palette index syntax elements further comprises:

for each respective palette index syntax element of the set of palette index syntax elements:

entropy decoding the data corresponding to the respective palette index syntax element to determine a binarized version of the respective palette index syntax element;

determining, based on a palette size and a number of consecutive locations with the same palette index, a binarization method; and determining the respective palette index syntax element using the determined binarization method to debinarize the binarized version of the respective palette index syntax element.

5. The method of claim 1, further comprising:

receiving a flag indicating whether an index value for the set of palette index syntax elements is predictable using a list of index predictors.

6. The method of claim 1, further comprising:

decoding a syntax element that indicates a maximum run value indicating in the set of run-related syntax element groups used for the current block; and decoding a run value using the maximum run value as a truncation value.

7. The method of claim 1, further comprising:

determining a first maximum palette index value;

determining a second maximum palette index value, wherein the second maximum palette index value comprises a maximum palette index value for when a run is greater than or equal to a run threshold value, and wherein the second maximum palette index value is less than the first maximum palette index value;

when a run value is greater than or equal to the run threshold value, coding an index value using truncated binary coding with a truncation value equal to the second maximum palette index value; and when the run value is less than the run threshold value, coding the index value using truncated binary coding with a truncation value equal to the first maximum palette index value.

8. The method of claim 1, further comprising:

decoding one or more index values for the one or more palette entries, at least one index value of the one or more index values belonging to a first region of the palette and at least one other index value of the one or more index values belonging to a second region of the palette, wherein index values of the second region are coded in a sequential scanning order according to a restriction, the restriction indicating that the index values are to appear in the second region in the sequential scanning order, wherein the first region of the palette comprises a first group of one or more sequential palette entries and the second region of the palette comprises a second group of one or more sequential palette entries that are different than the first group.

9. The method of claim 1, further comprising;

receiving the video data at a receiver of a wireless communication device;

storing the video data on a memory of the wireless communication device; and processing, by one or more processors, the video data stored in the memory to reconstruct the current block.

10. The method of claim 9, wherein the wireless communication device comprises a cellular telephone, and wherein receiving the video data at the receiver comprises demodulating the video data according to a cellular communication standard.

11. A device for decoding video data, the device comprising:

a memory configured to store a bitstream of video data; and one or more processors configured to:

determine, based on first entropy encoded data in the bitstream, a set of run-related syntax element groups for a current block of a current picture of the video data;

determine, based on second entropy encoded data in the bitstream, a set of palette index syntax elements for the current block, the first entropy encoded data occurring in the bitstream before the second entropy encoded data, wherein:

each respective run-related syntax element group of the set of run-related syntax element groups comprises a respective syntax element indicating a length of the respective run, each respective palette index syntax element of the set of palette index syntax elements indicates an entry in a palette comprising a set of sample values;

wherein to determine the set of run-related syntax element groups for the current block, for each respective run-related syntax element group of the set of run-related syntax element groups, the one or more processors are configured to:

select, from a plurality of entropy coding contexts, a respective entropy coding context for the respective run-related syntax element group, wherein the selection of the respective entropy coding context is:
not dependent on any of the palette index syntax elements, and
dependent on one or both of a position within the current block of a starting pixel of a respective run corresponding to the respective run-related syntax element group or a size of the palette;
entropy decode, based on the selected entropy coding context, a bin of the respective run-related syntax element group;
wherein to determine the set of palette index syntax elements the one or more processors are configured to, for each respective palette index syntax element of the set of palette index syntax elements:
obtain, from the bitstream, data corresponding to a respective one of the palette index syntax elements; and
entropy decode the data corresponding to the respective palette index syntax element to determine a respective entry in the palette;
reconstruct, based on the respective syntax elements indicating the respective entries in the palette and the respective syntax elements indicating the length of the respective runs, the current block; and
output video data comprising a decoded version of the reconstructed current block.

12. The device of claim 11, wherein to determine the set of palette index syntax elements the one or more processors are further configured to:
for each respective palette index syntax element of the set of palette index syntax elements:
entropy decode the data corresponding to the respective palette index syntax element to determine a binarized version of the respective palette index syntax element;
determine, based on a number of consecutive locations with the same palette index, a binarization method; and
determine the respective palette index syntax element using the determined binarization method to debinarize the binarized version of the respective palette index syntax element.

13. The device of claim 11, wherein to determine the set of palette index syntax elements the one or more processors are further configured to:
for each respective palette index syntax element of the set of palette index syntax elements:
entropy decode the data corresponding to the respective palette index syntax element to determine a binarized version of the respective palette index syntax element;
determine, based on a palette size, a binarization method; and
determine the respective palette index syntax element using the determined binarization method to debinarize the binarized version of the respective palette index syntax element.

14. The device of claim 11, wherein to determine the set of palette index syntax elements the one or more processors are further configured to:
for each respective palette index syntax element of the set of palette index syntax elements:
entropy decode the data corresponding to the respective palette index syntax element to determine a binarized version of the respective palette index syntax element;
determine, based on a palette size and a number of consecutive locations with the same palette index, a binarization method; and
determine the respective palette index syntax element using the determined binarization method to debinarize the binarized version of the respective palette index syntax element.

15. The device of claim 11, wherein the one or more processors are configured to:
receive a flag indicating whether an index value for the set of palette index syntax elements is predictable using a list of index predictors.

16. The device of claim 11, wherein the one or more processors are configured to:
decode a syntax element that indicates a maximum run value indicating in the set of run-related syntax element groups used for the current block; and
decode a run value using the maximum run value as a truncation value.

17. The device of claim 11, wherein the one or more processors are configured to:
determine a first maximum palette index value;
determine a second maximum palette index value, wherein the second maximum palette index value comprises a maximum palette index value for when a run is greater than or equal to a run threshold value, and wherein the second maximum palette index value is less than the first maximum palette index value;
when a run value is greater than or equal to the run threshold value, code an index value using truncated binary coding with a truncation value equal to the second maximum palette index value; and
when the run value is less than the run threshold value, code the index value using truncated binary coding with a truncation value equal to the first maximum palette index value.

18. The device of claim 11, wherein the one or more processors are configured to:
decode one or more index values for the one or more palette entries, at least one index value of the one or more index values belonging to a first region of the palette and at least one other index value of the one or more index values belonging to a second region of the palette, wherein index values of the second region are coded in a sequential scanning order according to a restriction, the restriction indicating that the index values are to appear in the second region in the sequential scanning order, wherein the first region of the palette comprises a first group of one or more sequential palette entries and the second region of the palette comprises a second group of one or more sequential palette entries that are different than the first group.

19. The device of claim 11, wherein the device comprises a wireless communication device, the device further comprising a receiver configured to receive encoded video data.

20. The device of claim 19, wherein the wireless communication device comprises a telephone handset and wherein the receiver is configured to demodulate, according to a wireless communication standard, a signal comprising the encoded video data.

21. An apparatus for decoding video data, the apparatus comprising:

means for receiving a bitstream of encoded video data;

means for determining, based on first entropy encoded data in the bitstream, a set of run-related syntax element groups for a current block of a current picture of the video data;

means for determining, based on second entropy encoded data in the bitstream, a set of palette index syntax elements for the current block, the first entropy encoded data occurring in the bitstream before the second entropy encoded data, wherein:

each respective run-related syntax element group of the set of run-related syntax element groups comprises a respective syntax element indicating a length of the respective run, each respective palette index syntax element of the set of palette index syntax elements indicates an entry in a palette comprising a set of sample values; and wherein the means for determining the set of run-related syntax element groups for the current block comprises, for each respective run-related syntax element group of the set of run-related syntax element groups:

means for selecting, from a plurality of entropy coding contexts, a respective entropy coding context for the respective run-related syntax element group, wherein the selection of the respective entropy coding context is:

not dependent on any of the palette index syntax elements, and dependent on one or both of a position within the current block of a starting pixel of a respective run corresponding to the respective run-related syntax element group or a size of the palette; and means for entropy decoding, based on the selected entropy coding context, a bin of the respective run-related syntax element group;

wherein the means for determining the set of palette index syntax elements comprises, for each respective palette index syntax element of the set of palette index syntax elements:

means for obtaining, from the bitstream, data corresponding to a respective one of the palette index syntax elements; and means for entropy decoding the data corresponding to the respective palette index syntax element to determine a respective entry in the palette;

means for reconstructing, based on the respective syntax elements indicating the respective entries in the palette and the respective syntax elements indicating the length of the respective runs, the current block; and means for outputting video data comprising a decoded version of the reconstructed current block.

22. A non-transitory computer readable storage medium storing instructions that when executed by one or more processors cause the one or more processors to:

receive a bitstream of encoded video data;

determine, based on first entropy encoded data in a bitstream, a set of run-related syntax element groups for a current block of a current picture of the video data;

determine, based on second entropy encoded data in the bitstream, a set of palette index syntax elements for the current block, the first entropy encoded data occurring in the bitstream before the second entropy encoded data, wherein:

each respective run-related syntax element group of the set of run-related syntax element groups comprises a respective syntax element indicating a length of the respective run, each respective palette index syntax element of the set of palette index syntax elements indicates an entry in a palette comprising a set of sample values; and wherein to determine the set of run-related syntax element groups for the current block, for each respective run-related syntax element group of the set of run-related syntax element groups, the instructions cause the one or more processors to:

select, from a plurality of entropy coding contexts, a respective entropy coding context for the respective run-related syntax element group, wherein the selection of the respective entropy coding context is:

not dependent on any of the palette index syntax elements, and dependent on one or both of a position within the current block of a starting pixel of a respective run corresponding to the respective run-related syntax element group or a size of the palette, entropy decode, based on the selected entropy coding context, a bin of the respective run-related syntax element group;

wherein to determine the set of palette index syntax elements, for each respective palette index syntax element of the set of palette index syntax elements, the instructions cause the one or more processors to:

obtain, from the bitstream, data corresponding to a respective one of the palette index syntax elements; and entropy decode the data corresponding to the respective palette index syntax element to determine a respective entry in the palette;

reconstruct, based on the respective syntax elements indicating the respective entries in the palette and the respective syntax elements indicating the length of the respective runs, the current block; and outputting video data comprising a decoded version of the reconstructed current block.

23. The method of claim 1, wherein determining the set of palette index syntax elements for the current block comprises bypass decoding the second entropy encoded data.

24. The device of claim 11, wherein to determine the set of palette index syntax elements for the current block, the one or more processors are configured to bypass decode the second entropy encoded data.

* * * * *